United States Patent
Niwa

(10) Patent No.: US 11,838,476 B2
(45) Date of Patent: Dec. 5, 2023

(54) INFORMATION PROCESSING APPARATUS THAT CONDITIONALLY PROHIBITS SETTING A RELAY SYSTEM AS AN IMAGE DATA TRANSFER DESTINATION, CONTROL METHOD THEREOF, AND STORAGE MEDIUM

(71) Applicant: CANON KABUSHIKI KAISHA, Tokyo (JP)

(72) Inventor: Koji Niwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/837,658

(22) Filed: Jun. 10, 2022

(65) Prior Publication Data
US 2022/0407982 A1  Dec. 22, 2022

(30) Foreign Application Priority Data
Jun. 16, 2021 (JP) .................. 2021-100214

(51) Int. Cl.
*H04N 1/32* (2006.01)
*H04N 1/00* (2006.01)

(52) U.S. Cl.
CPC ..... *H04N 1/32411* (2013.01); *H04N 1/00413* (2013.01); *H04N 1/32096* (2013.01)

(58) Field of Classification Search
None
See application file for complete search history.

(56) References Cited

U.S. PATENT DOCUMENTS

2015/0268894 A1*  9/2015  Saito ............. G06F 3/1206
                                    358/1.16
2019/0102385 A1*  4/2019  Tokita ........... G06F 16/164

FOREIGN PATENT DOCUMENTS

JP          2015-32044 A      2/2015

* cited by examiner

*Primary Examiner* — Lennin R Rodriguezgonzalez
(74) *Attorney, Agent, or Firm* — Venable LLP

(57) ABSTRACT

Even in a case where a failure has occurred in a relay system or a cloud service, image data transmitted from a multi function peripheral is prevented from being lost. In an image processing apparatus that performs transfer setting of image data, at the time of a user designating a transfer destination, display control of a user interface screen is performed so that a storage server or the like other than the relay system is set as another transfer destination.

9 Claims, 25 Drawing Sheets

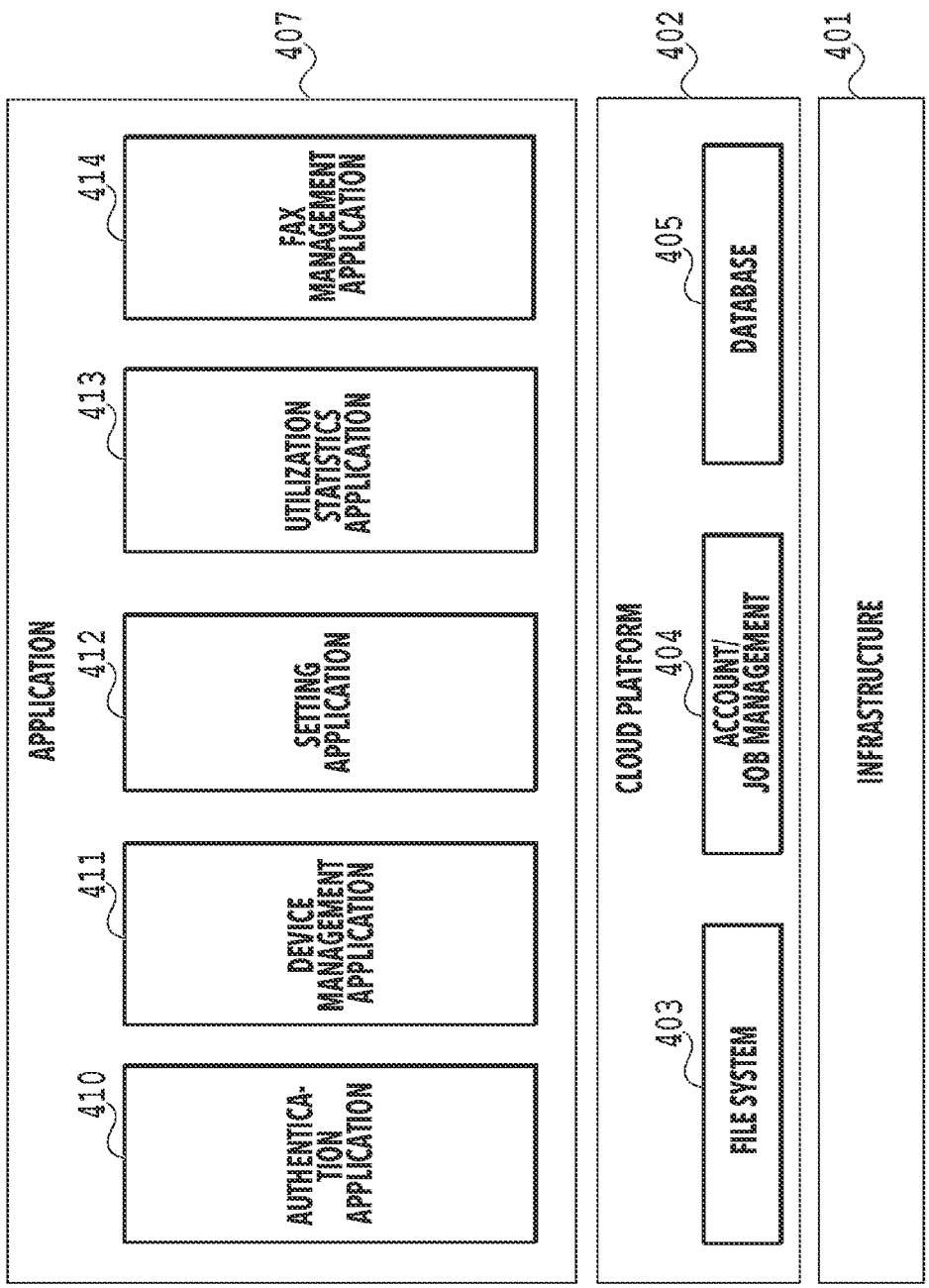

INFORMATION PROCESSING APPARATUS THAT CONDITIONALLY PROHIBITS SETTING A RELAY SYSTEM AS AN IMAGE DATA TRANSFER DESTINATION, CONTROL METHOD THEREOF, AND STORAGE MEDIUM

BACKGROUND

Field

The present disclosure relates to a technique to transfer a FAX document.

Description of the Related Art

Conventionally, among multi function peripherals, there is one having a function to transmit data of a document image received by a facsimile (in the following, called "FAX image") to a specific server or the like on a network. In addition, there is also a multi function peripheral having a function to transmit FAX image data to a cloud service via a relay system connected via a network, such as the internet (for example, see Japanese Patent Laid-Open No. 2015-32044). Here, the cloud service refers to, for example, an online storage that provides a service of lending a storage server and a mail service of performing mail distribution.

In a case where FAX image data is transferred to the cloud service via the relay system, it is possible for the multi function peripheral to retry until the transfer of the FAX image data to the relay system succeeds, and therefore, it is possible for the multi function peripheral side to guarantee the transfer of the FAX image data from the multi function peripheral to the relay system. However, whether the transfer of the FAX image data from the relay system to the cloud service has succeeded is determined by the processing on the relay system side, and therefore, it is not possible for the multi function peripheral side to cope with this. For example, in a case where a failure has occurred in the cloud service, the relay system cannot transfer the FAX image data to the cloud server and it is not possible for the multi function peripheral side to check the fact or to deal with this. Further, depending on the situation of the failure, there is a risk that the FAX image data already transmitted to the relay system is lost.

SUMMARY

The image processing apparatus according to the technique of the present disclosure includes a memory that stores a program; and a processor that executes the program to perform: transferring image data; setting a transfer destination of the image data; and controlling a user interface screen for a user to designate the transfer destination, wherein in the controlling, in a case where a relay system that further transfers received image data is set as the transfer destination, display control of the user interface screen is performed so that another transfer destination other than the relay system is set.

Further features of the present disclosure will become apparent from the following description of exemplary embodiments with reference to the attached drawings.

BRIEF DESCRIPTION OF THE DRAWINGS

FIG. 4 is a software configuration diagram of a relay server.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Figure 1:
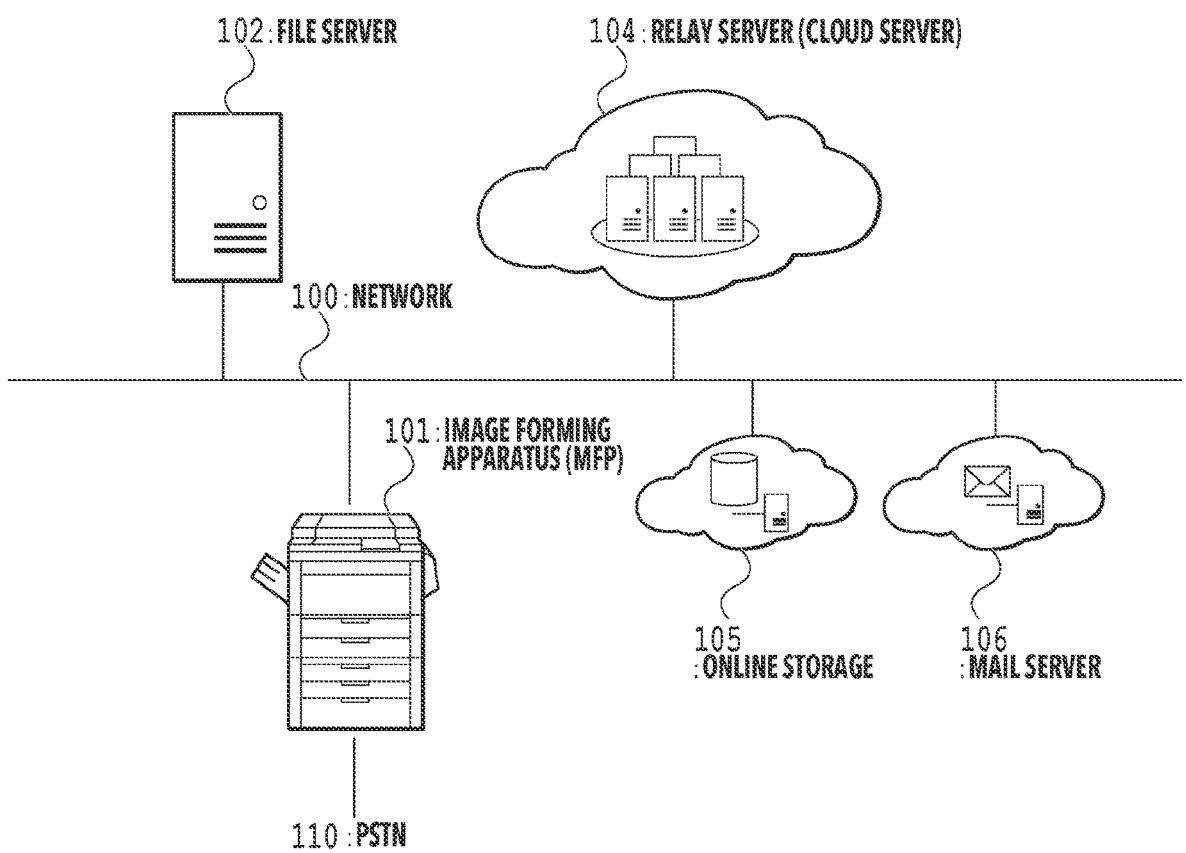
FIG. 1 a diagram showing a general configuration of an image processing system.

<System Configuration>
FIG. 1 is a general diagram of an image processing system. In FIG. 1, on a network 100 that supports the TCP/IP protocol, an MFP (Multi Function Peripheral) 101, a file server 102, and a relay server 104 are connected to one another so that communication is possible. The MFP 101 is an example of an image processing apparatus having a plurality of functions, such as scan, print, copy, and FAX functions. The file server 102 is an example of an external server capable of storing image data and the like.

The MFP 101 is a multi function peripheral that is connected to PSTN (Public Switched Telephone Networks) 110 and capable of performing FAX communication of document image data with a FAX machine, not shown schematically. In the following, in the present specification, the document image data received by the MFP 101 by FAX communication is called "FAX image data".

The relay server 104 is an example of an information processing apparatus having a function to transmit FAX image data received from the MFP 101 to an online storage 105, a mail server 106 and the like, which are connected via the network 100.

The online storage 105 is implemented by one or more information processing apparatuses. The online storage 105 is a server that provides a service of lending the storage area (storage device) of the storage. As one example of the online storage, mention is made of Google Drive (registered trademark), OneDrive (registered trademark), Dropbox (registered trademark) and the like.

The mail server 106 is implemented by one or more information processing apparatuses. The mail server 106 is a server for performing transmission and reception of an electronic mail.

The above shows a general system configuration and the system configuration is not limited to this. For example, in addition to the configuration described above, an information processing apparatus, such as a PC (personal computer) used by a user for accessing information on the cloud service, may be connected to the network 100.

Alternatively, the configuration may be one in which the MFP 101 is connected to the online storage 105, the main server 106 and the like via the network 100.

<Hardware Configuration of MFP 101>

Figure 2:
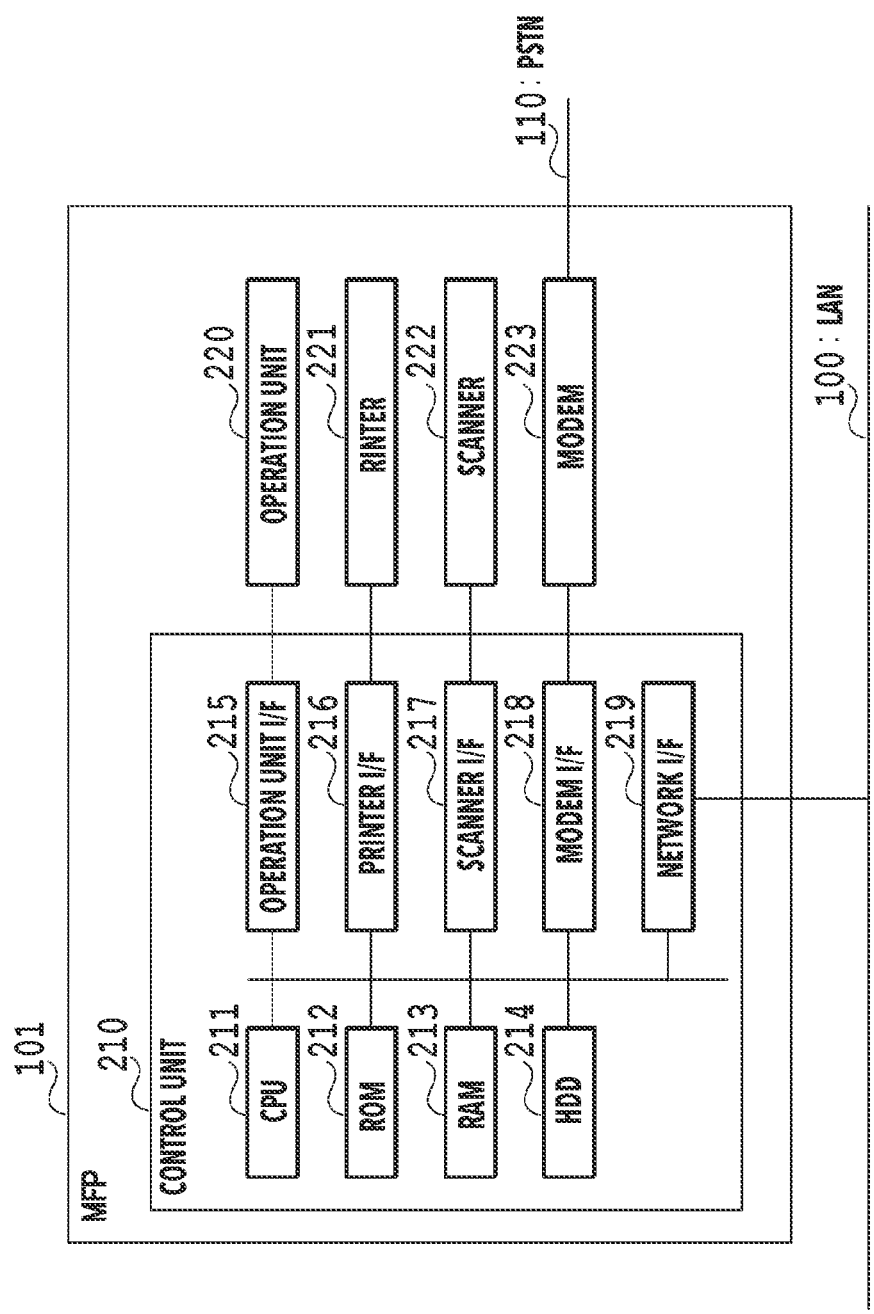
FIG. 2 is a hardware configuration diagram of an MFP.

FIG. 2 is a hardware configuration diagram of the MFP 101. A control unit 210 including a CPU 211 controls the operation of the entire MFP 101. The CPU 211 reads control programs stored in a ROM 212 and performs various kinds of control, such as reading/printing/communication. A RAM 213 is used as a temporary storage area, such as a main memory and a work area, of the CPU 211. It is assumed that in the MFP 101, the one CPU 211 performs each piece of processing shown in a flowchart, to be described later, by using one memory (RAM 213 or HDD 214), but another aspect may also be accepted. For example, it is also possible to perform each piece of processing shown in the flowchart by causing a plurality of CPUs and a plurality of RAMs or HDDs to cooperate with one another.

The HDD 214 stores image data and various programs. An operation unit I/F 215 connects an operation unit 220 and the control unit 210. The operation unit 220 is provided with a liquid crystal display having a touch panel function, a keyboard and the like and has a role as the reception unit configured to receive the operation/input/instructions by a user.

A printer I/F 216 connects a printer 221 and the control unit 210. The image data to be printed in the printer 221 is transferred from the control unit 210 via the printer I/F 216 and printed on a printing medium by the printer 221.

A scanner I/F 217 connects a scanner 222 and the control unit 210. The scanner 222 generates image data by reading an image on a document and inputs the image data to the control unit 210 via the scanner I/F 217. It is possible for the MFP 101 to transmit the image data generated by the scanner 222 as a file or as a mail.

A modem I/F 218 connects a modem 223 and the control unit 210. The modem 223 performs FAX communication with a FAX machine, not shown schematically.

A network I/F 219 connects the control unit 210 (MFP 101) to the network 100. The MFP 101 transmits image data and information to an external device (the file server 102 and the like), the relay server 104 and the like, receives various kinds of information, and so on, by using the network I/F 219.

<Software Configuration of MFP 101>

Figure 3:
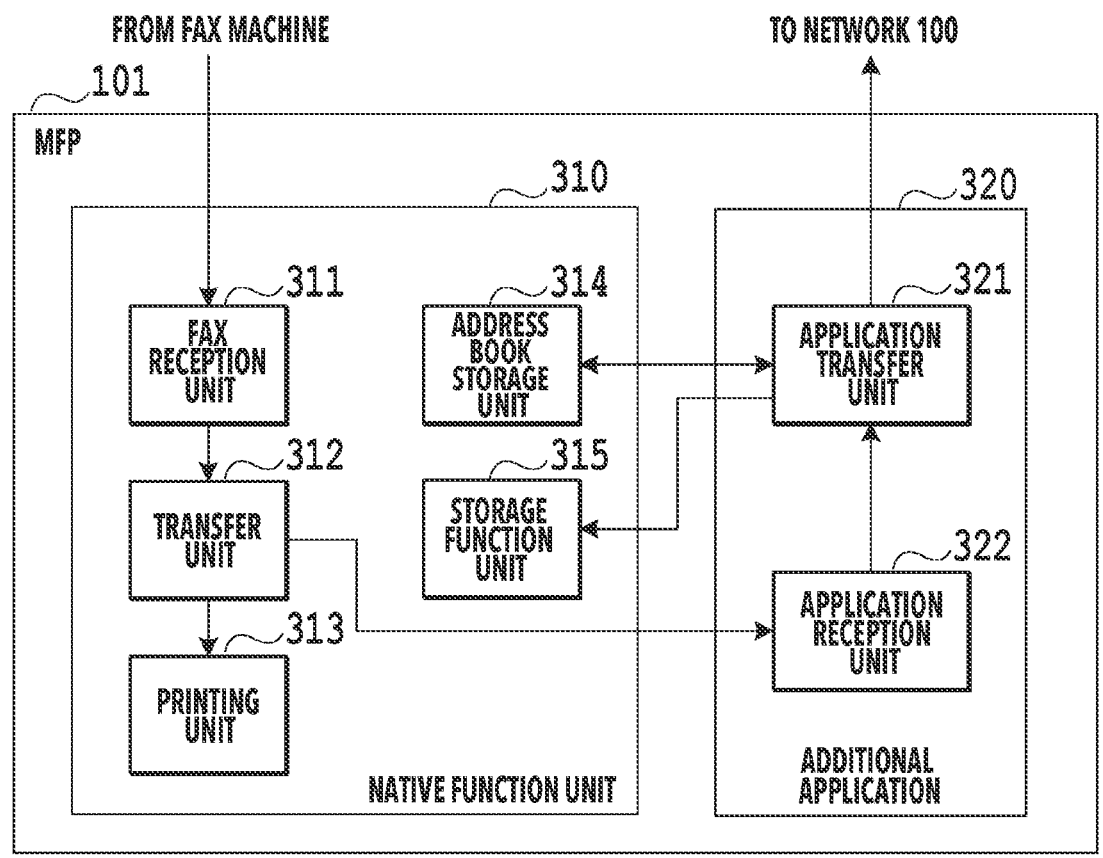
FIG. 3 is a software configuration diagram of an MFP.

FIG. 3 is a software configuration diagram of the MFP 101. The software of the MFP 101 is roughly divided into two: a native function unit 310 and an additional application 320. While each unit included in the native function unit 310 is provided in the MFP 101 as a standard unit, the additional application 320 is an application that is installed in the MFP 101 additionally. The additional application 320 is an application based on Java (registered trademark) and it is possible to easily implement the addition of a function to the MFP 101. It may also be possible to install another additional application, not shown schematically, in the MFP 101.

A FAX reception unit 311 receives document image data that is transmitted via the PSTN 110. The document image data received by the FAX reception unit 311 is converted into a PDF format or the like and then delivered to a transfer unit 312. Further, at this time, the FAX reception unit 311 creates a control file including transmission source information (FAX number of the transmission source) on the document image data and the reception date of the document image data and delivers it to the transfer unit 312 along with the document image data.

The transfer unit 312 transfers the FAX image data received from the FAX reception unit 311 in accordance with a condition that is set in advance. As the transfer destination of the FAX image data, it is possible to set a printing unit 313, the file server 102, a PC (not shown schematically) on the LAN 100, and the like. Here, it is assumed that the setting is performed so that all the FAX image data is transferred to the additional application 320 temporarily.

The transfer unit 312 has an FTP (File Transfer Protocol) client function and transfers FAX image data to an application reception unit 322 having an FTP server function by the FTP. The control file created by the FAX reception unit 311 is also transferred to the application reception unit 322 by the FTP along with the image data. An address book storage unit 314 stores address information registered by a user of the MFP 101.

A storage function unit 315 is an internal storage having the same function as that of the file server 102. That is, it is possible for the storage function unit 315 to store FAX image data, cause a PC or the like, not shown schematically to refer to the stored FAX image data by receiving access therefrom.

The application reception unit 322 receives the FAX image data internally transferred from the transfer unit 312 and delivers the FAX image data to an application transfer unit 321. The application transfer unit 321 transfers (transmits) the FAX image data to the file server 102, the storage function unit 315, the relay server 104 and the like in accordance with the setting performed by a method, to be described later. The transfer here can use SMB, WebDAV, HTTPS and the like, in addition to the FTP. Further, the application transfer unit 321 is allowed to access the address book storage unit 314 and obtains a registration name, to be described later. The obtained registration name is used as a folder path of a transfer destination and a file name. Further, the application transfer unit 321 also has a function to transmit the registration name obtained from the address book storage unit 314 and FAX reception information including information on the control file received from the transfer unit 312 at the time of transmitting the FAX image data to the relay server 104.

<Software Configuration of Relay Server 104>

FIG. 4 is a diagram showing the software configuration of the relay server 104.

An infrastructure 401 is an infrastructure for the relay server 104 to provide services and includes a server, a virtual machine, a storage, a network, and an operating system.

A cloud platform 402 is a framework that provides a common basic function to an application 407 by utilizing the infrastructure 401 and includes a file system 403, an account/job management 404, and a database 405.

It is possible for the application 407 to communicate with a web browser that runs on a PC and the like, not shown schematically, and display a menu on a web browser screen of the PC and receive an input from a user. The application 407 is a software module that manages the account of a user who can utilize the MFP 101, visualizes utilization statics of the MFP 101 and provides various functions of the MFP 101 to a user.

An authentication application 410 is one of the application 407 and manages a user who can utilize the MFP 101 by utilizing the account/job management 404, which is the cloud platform 402. For the user authentication, it may also be possible to utilize an external authentication server, for example, such as ActiveDirectory and LDAP, in place of utilizing the account/job management 404, which is the cloud platform 402.

A device management application 411 is one of the applications 407 and performs device management, such as registration, editing, and deletion of a device, such as the connection-target MFP 101.

A utilization statistics application 413 is one of the applications 407 and manages statistics information on the record of utilization of the functions, such as print, scan and FAX functions. As regards the display method of statistics information, the statistics information is displayed on the web browser scree of the PC for each multi function peripheral registered in the device management application 411 or for each user registered in the authentication application 410.

A FAX management application 414 is one of the application 407. The FAX management application 414 has a function to transmit FAX image data received from the MFP 101 to the cloud service (the online storage 105 and the mail server 106) and a function to receive the setting of a cloud service of the transfer destination, a folder path, a file name and the like for each device.

<Explanation of UI Screen Relating to FAX Transfer of MFP>

FIG. 5A to FIG. 10B are each an example of a user interface screen (UI screen) relating to the FAX transfer function (the additional application 320) in the MFP 101. A user performs various settings for transferring image data received by a facsimile in the MFP 101 to the file server 102 and the like on these UI screens. These UI screens are displayed on the operation unit 220 by the CPU 211 of the MFP 101 executing control programs stored in the HDD 214.

Figure 5A:
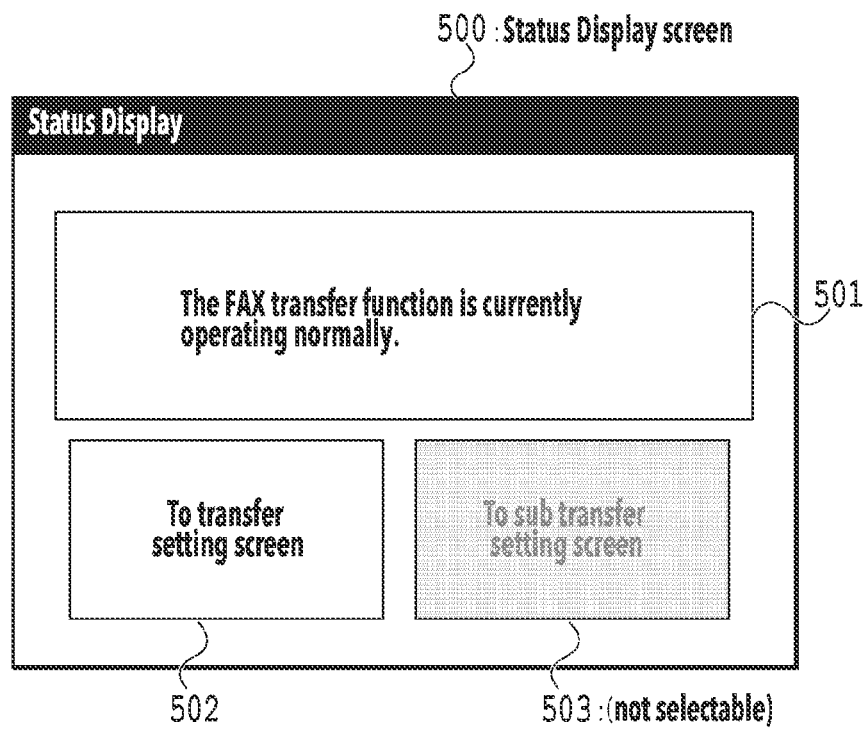
FIG. 5A and FIG. 5B are each a diagram showing an example of a user interface screen relating to a FAX transfer function.
Figure 5B:
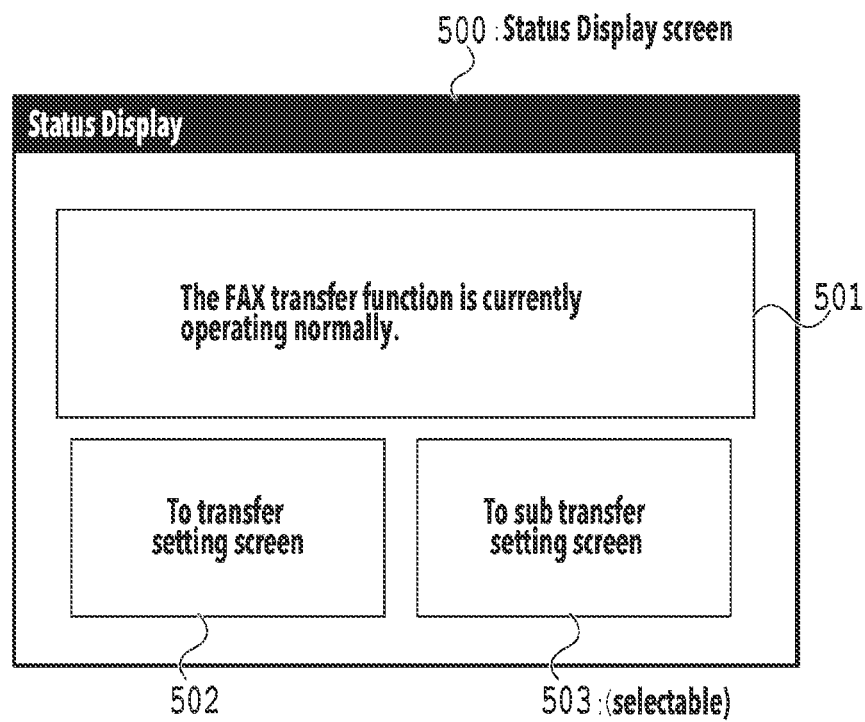

FIG. 5A and FIG. 5B are each an example of a Status Display screen 500 according to the present embodiment. In a status display area 501 on the Status Display screen 500, a message indicating the operation status of the current FAX transfer function and the like are displayed. In the example show schematically, it is indicated that the additional application 320 is currently operating normally. For example, in a case where the transfer of FAX image data to the file server 102 and the like has failed or in a case where the additional application 320 is in the state of not operating normally, a message to that effect is displayed in the status display area 501. Of course, it may also be possible to display a guide relating to the transfer setting so that it is made easier for a user to perform the transfer setting. Further, it may also be possible to further provide an operation key for updating the display contents of the status display area 501 within the Status Display screen 500. A [To transfer setting screen] key 502 is a button for a user to start the input relating to the first transfer setting and a [To sub transfer setting screen] key 503 is a button for a user to start the input relating to the second and subsequent transfer settings. In a case where the [To transfer setting screen] key 502 is pressed down, a Transfer Destination Setting screen 600 shown in FIG. 6A for designating the first transfer destination is displayed. The display of the [To sub transfer setting screen] key 503 is controlled so as to be, for example, grayed out so that the [To sub transfer setting screen] key 503 cannot not be selected until the designation of the first transfer destination is completed. In a case where the [To sub transfer setting screen] key 503 is pressed down, the Transfer Destination Setting screen 600 shown in FIG. 6B for designating the second transfer destination is displayed.

Figure 6A:
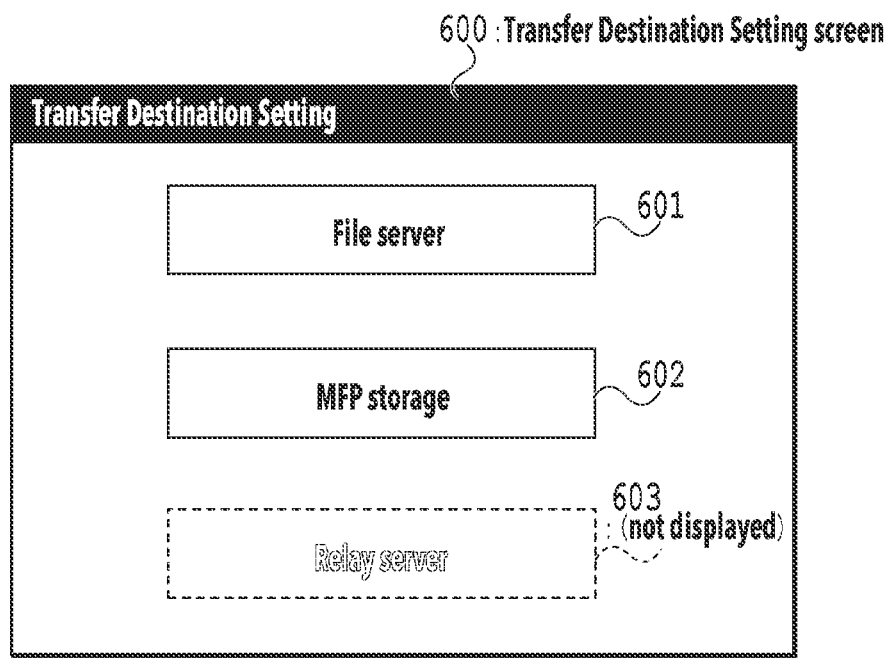
FIG. 6A and FIG. 6B are each a diagram showing an example of a user interface screen relating to a FAX transfer function.
Figure 6B:
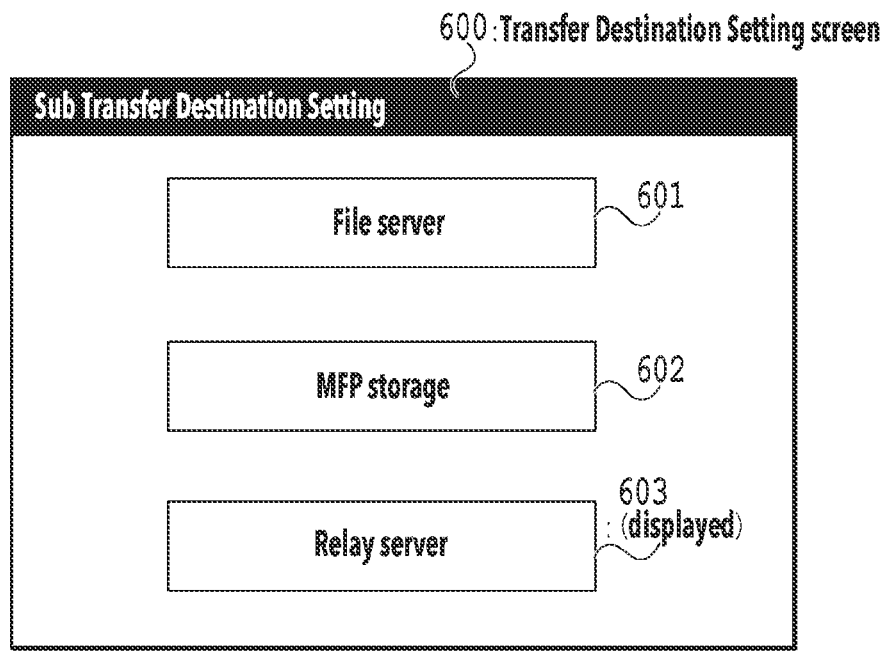
Figure 7A:
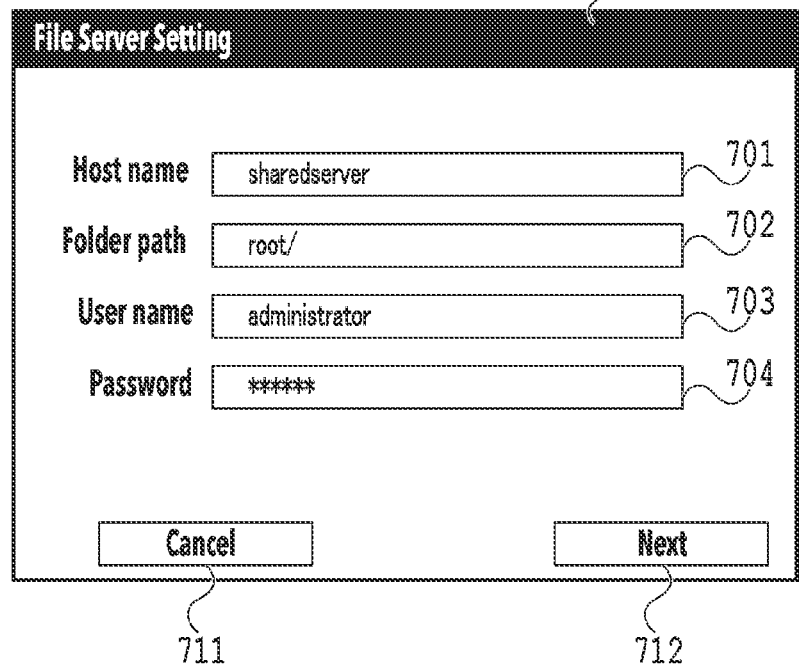
FIG. 7A and FIG. 7B are each a diagram showing an example of a user interface screen relating to a FAX transfer function.
Figure 7B:
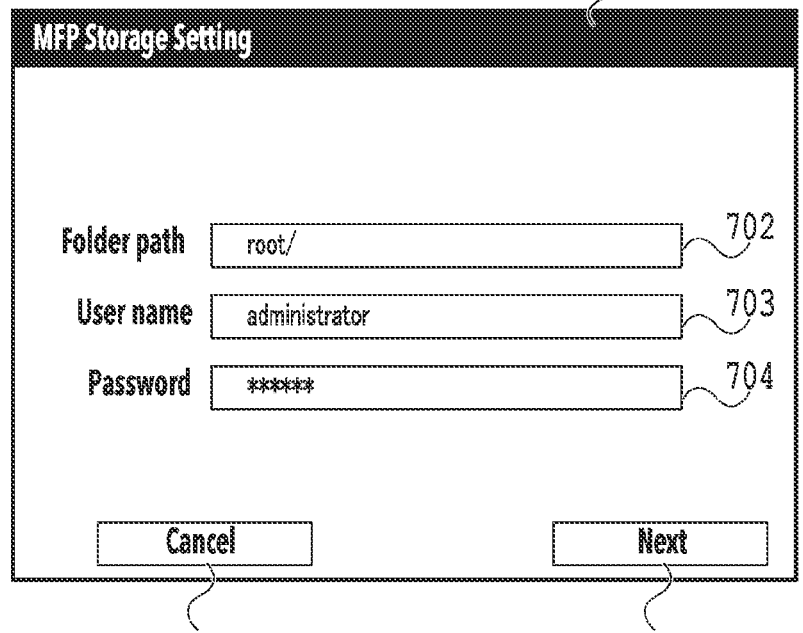
Figure 10A:
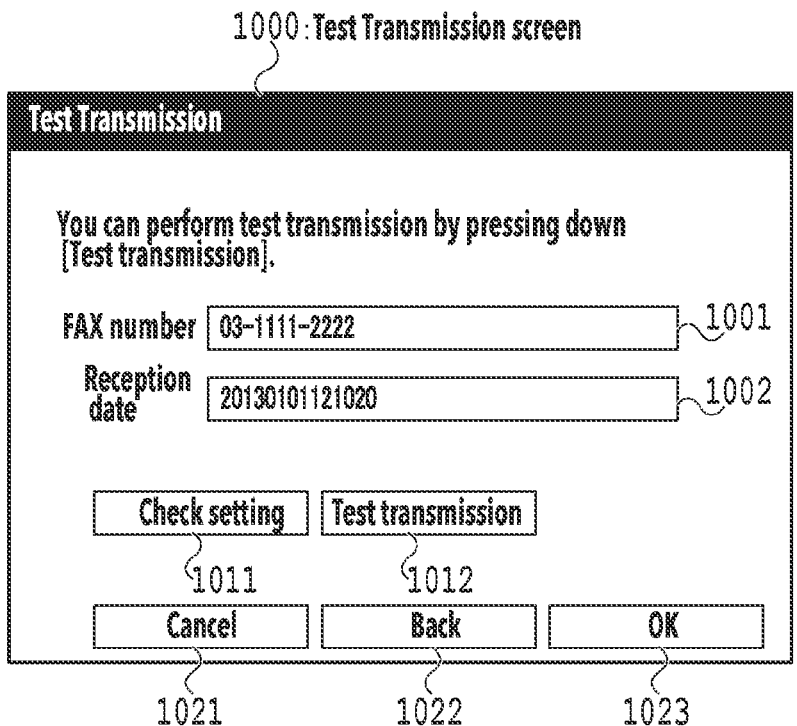
FIG. 10A and FIG. 10B are each a diagram showing an example of a user interface screen relating to a FAX transfer function.

FIG. 6A and FIG. 6B are each an example of the transfer destination setting screen. On the Transfer Destination Setting screen 600, the designation of a transfer destination of FAX image data is received. In a case where a [File server] key 601 is pressed down, the transfer destination is taken to be the file server and a File Server Setting screen 700 shown in FIG. 7A is displayed. In a case where an [MFP storage] key 602 is pressed down, the transfer destination is taken to be the storage function unit 315, which is the internal storage, and an MFP Storage Setting screen 710 shown in FIG. 7B is displayed. A [Relay server] key 603 is displayed only in a case where the second transfer destination is designated and in that case, the state is brought about where it is possible to designate the relay server 104 as the transfer destination. In a case where the [Relay server] key 603 is pressed down, a Test Transmission screen 1000 shown in FIG. 10A is displayed. The reason the File Server Setting screen 700 or the MFP Storage Setting screen 710 is not displayed at this time is that the setting to transfer FAX image data to the cloud service via the relay server 104 is performed on a FAX transfer setting screen of the relay server 104, to be described later.

FIG. 7A is an example of the file server setting screen and FIG. 7B is an example of the MFP storage setting screen. On the File Server Setting screen 700 and the MFP Storage Setting screen 710, information for specifying the file server 102 and information for accessing the file server 102 or the storage function unit 315 are set. To Host name 701, the host name of the file server 102 is input. To Folder path 702, the starting point of the folder path for specifying the storage destination of the FAX image data is input. To User name 703 and to Password 704, the authentication information (user name and password) necessary for logging in to the file server 102 or the storage function unit 315 is input. On the MFP Storage Setting screen 710, the storage destination is specified to the storage function unit 315, and therefore, it is not necessary to input the host name.

Figure 8:
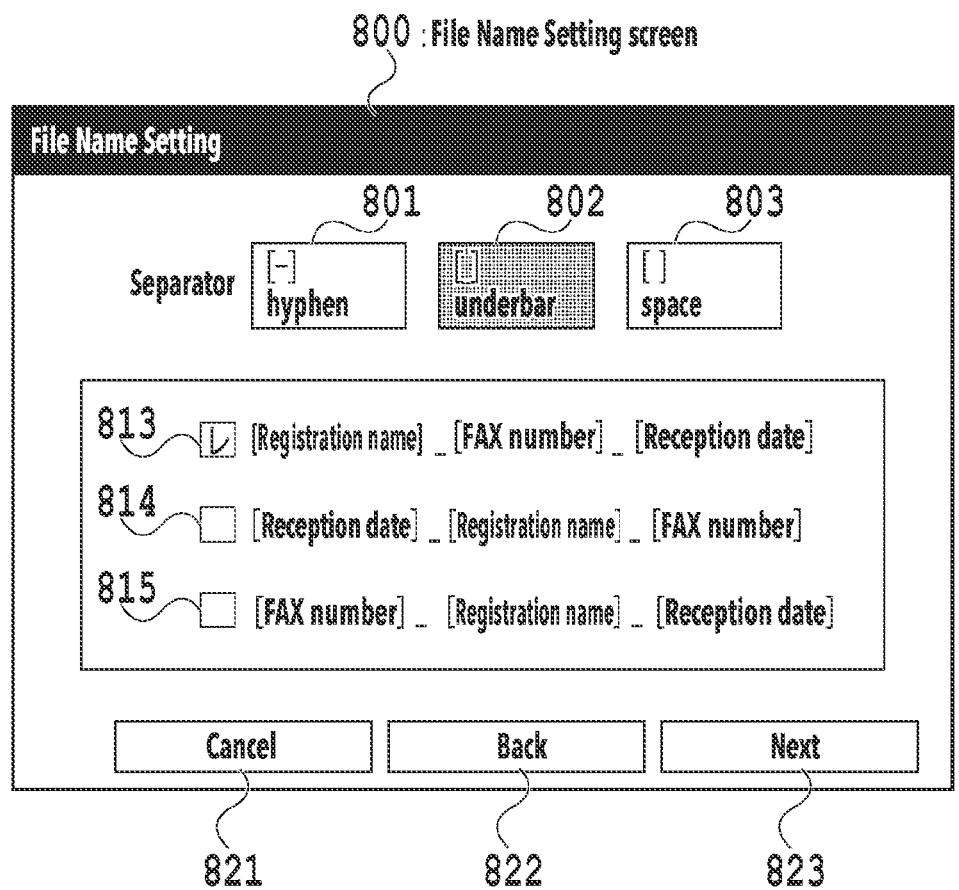
FIG. 8 is a diagram showing an example of a user interface screen relating to a FAX transfer function.

FIG. 8 is an example of a file name setting screen. On a File Name Setting screen 800, the rule of a file name attached to the FAX image data that is transferred to the file server 102 or the storage function unit 315 is set.

It is possible to set a file name that combines three kinds of information, that is, [Registration name], [FAX number], and [Reception date], to the FAX image data that the additional application 320 transfers to the file server 102 or the storage function unit 315. [Registration name] is a name registered in advance in the address book in association with the FAX number of the transmission source of the FAX image data. [FAX number] is the FAX number of the transmission source of the FAX image data. [Reception date] is the reception date of the FAX image data.

Operation keys 801 to 803 are keys for receiving selection of a separator (delimiter) for separating the above-described three kinds of information. In a case where the operation key 801 is pressed down, [-] (hyphen) is selected. In a case where the operation key 802 is pressed down, [_] (underbar) is selected. In a case where the operation key 803 is pressed down, [ ] (space) is selected. In the example shown schematically, [_] (underbar) is highlighted, indicating that the underbar is selected by a user.

Check boxes 813 to 815 are used to designate the arrangement order of the above-described three kinds of information. In a case where the check box 813 is selected, the file name is set in the arrangement order of [Registration name], [FAX number], and [Reception date]. For example, in a case where the registration name is "ABC commercial company", the FAX number is "0311112222", and the reception date is "12:15:10, Jan. 1, 2021", a file name of "ABC commercial company_0311112222_20210101121510.pdf" is set. Ina case where the check box 814 is selected, the file name is set in the arrangement order of [Reception date], [Registration name], and [FAX number]. In a case where the check box 815 is selected, the file name is set in the arrangement order of [FAX number], [Registration name], and [Reception date]. Here, all the arrangement orders are not taken as candidates (only part of the arrangement orders are taken as candidates), but it may also be possible enable selection of all the arrangement orders as candidates.

Figure 9:
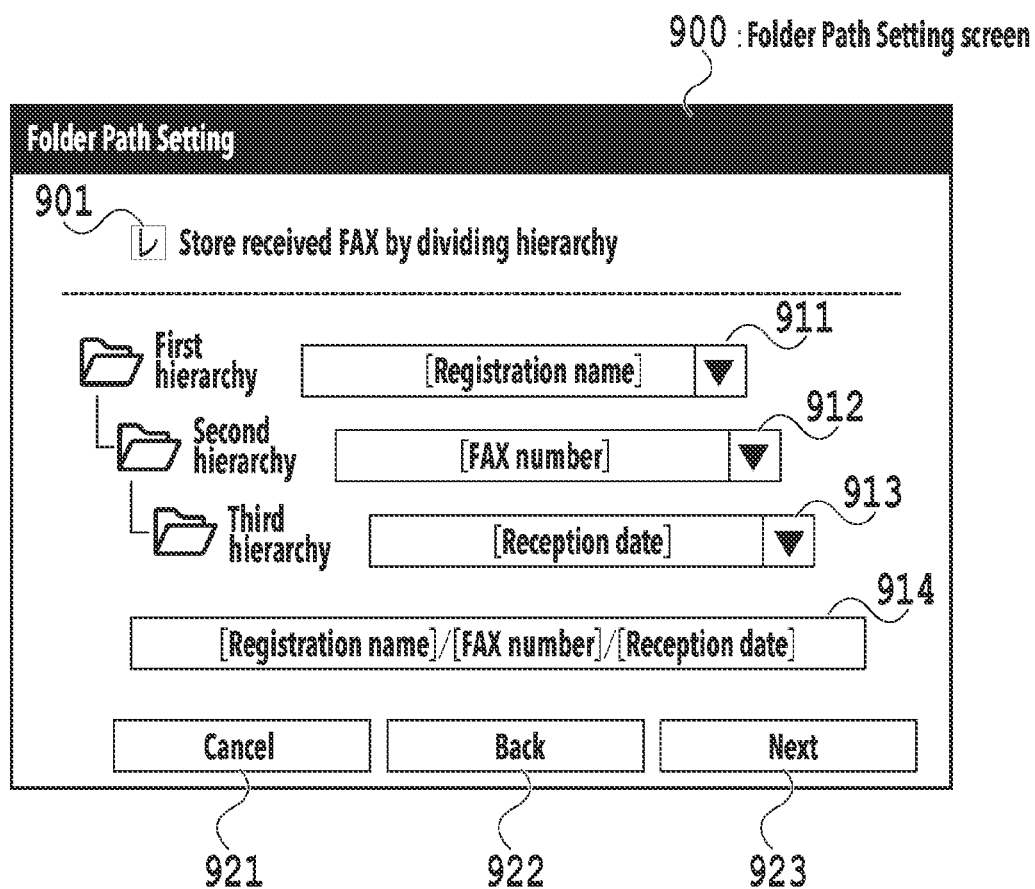
FIG. 9 is a diagram showing an example of a user interface screen relating to a FAX transfer function.

FIG. 9 is an example of a folder path setting screen. On a Folder Path Setting screen 900, the rule of a folder path for specifying the folder that is the storage destination of FAX image data is set.

In a case where a check box 901 is selected, FAX image data is stored in the folder designated by selection fields 911 to 913 and in a case where the check box 901 is not checked, the FAX image data is stored in the area indicated in Folder path 702 on the File Server Setting screen 700.

In the selection field 911, the type of information that is used as the folder name of the first hierarchy (the highest hierarchy of three hierarchies) is designated. The selection of the type of information is received from candidates of [Registration name], [FAX number], and [Reception date], which are presented in a pulldown menu. [Registration name] is a name registered in advance in the address book in association with the FAX number of the transmission source of the FAX image data. [FAX number] is the FAX number of the transmission source of the FAX image data. [Reception date] is the reception date of the FAX image data. It is also possible to leave any type unselected and in this case, the FAX image data is stored in the area designated in Folder path 702 on the File Server Setting screen 700.

In the selection field 912, the type of information that is used as the folder name of the second hierarchy (the middle hierarchy of the three hierarchies) is designated. Like the first hierarchy, the selection of type of information is received from candidates of [Registration name], [FAX number], and [Reception date], which are presented in the pulldown menu. It is also possible to leave any type unselected and in this case, the FAX image data is stored within the folder designated in the selection field 911.

In the selection field 913, the type of information that is used as the folder name of the third hierarchy (the lowest hierarchy of the three hierarchies) is designated. Like the first hierarchy, the selection of the type of information is received from candidates of [Registration name], [FAX number], and [Reception date], which are presented in the pulldown menu. It is also possible to leave any type unselected and in this case, the FAX image data is stored within the folder designated in the selection field 912.

In a display field 914, the arrangement order of various kinds of information in accordance with the selection for each hierarchy in the selection fields 911 to 913 is indicated. In the example shown schematically, it can be seen that the folder name in the first hierarchy is [Registration name], the folder name in the second hierarchy is [FAX number], and the folder name in the third hierarchy is [Reception date]. By attaching the folder path indicated in the display field 914 to the end of the character string designated in Folder path 702 on the File Server Setting screen 700, a formal folder path is completed. For example, in a case where the registration name is "ABC commercial company", the FAX number is "0311112222", and the reception date is "Jan. 1, 2021", a folder path of "root/ABC commercial company/ 0311112222/20210101" is set.

Figure 10B:
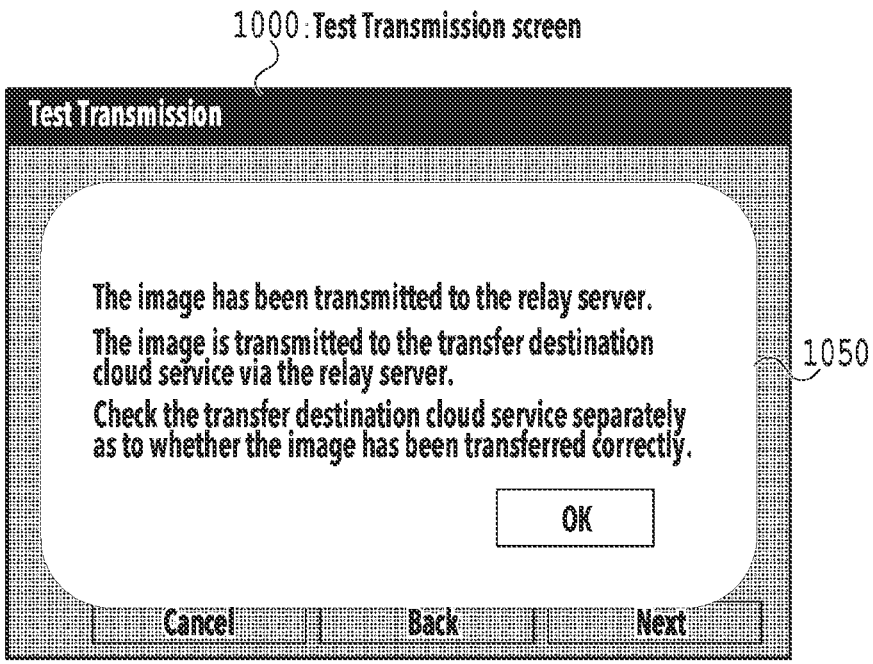

FIG. 10A and FIG. 10B are each an example of the test transmission screen. On the Test Transmission screen 1000, the setting relating to the test transmission to the transfer destination (the file server 102, the storage function unit 315, or the relay server 104) designated on the Transfer Destination Setting screen 600 is performed.

To FAX number 1001, the FAX number of an arbitrary transmission source, which is used for test transmission, is input. Further, to Reception date 1002, an arbitrary reception date, which is used for test transmission, is input. Although explanation is omitted, in a case where a [Check setting] key 1011 is pressed down, based on FAX number 1001 and Reception date 1002 and the setting contents on the various setting screens in FIG. 6A to FIG. 9, in which folder with what file name, the FAX image data is stored is displayed. Due to this, it is possible for a user to check the setting contents relating to the FAX transfer.

In a case where a [Test transmission] key 1012 is pressed down, based on the contents of FAX number 1001 and Reception date 1002 and the setting contents on the various setting screens in FIG. 6A to FIG. 9, test transmission is performed. In the test transmission, test image data stored in advance within the additional application (within the HDD 214) is transmitted to the transfer destination. By performing the test transmission, it is possible to check that the FAX image data is stored correctly in the folder of the file server 102 or the storage function unit 315. After performing the test transmission, it may also be possible to display a UI screen on which the results of the test transmission are shown. In a case where the transfer destination is set to the relay server 104, along with the FAX image data, FAX reception information including the contents of FAX number 1001 and Reception date 1002 is transmitted to the relay server 104 and this processing is terminated. As to whether or not the FAX image data is stored in the cloud service via the relay server 104, it is necessary to check the cloud service side (the online storage 105 or the mail server 106). Because of this, it may also be possible to adopt a configuration in which an information dialog 1050 prompting a user to make a check as shown in FIG. 10B is displayed in a case where the transmission to the relay server 104 has succeeded.

<Explanation of UI Screen Relating to Function Provision of Relay Server>

<<Device Management Screen>>

Figure 11A:
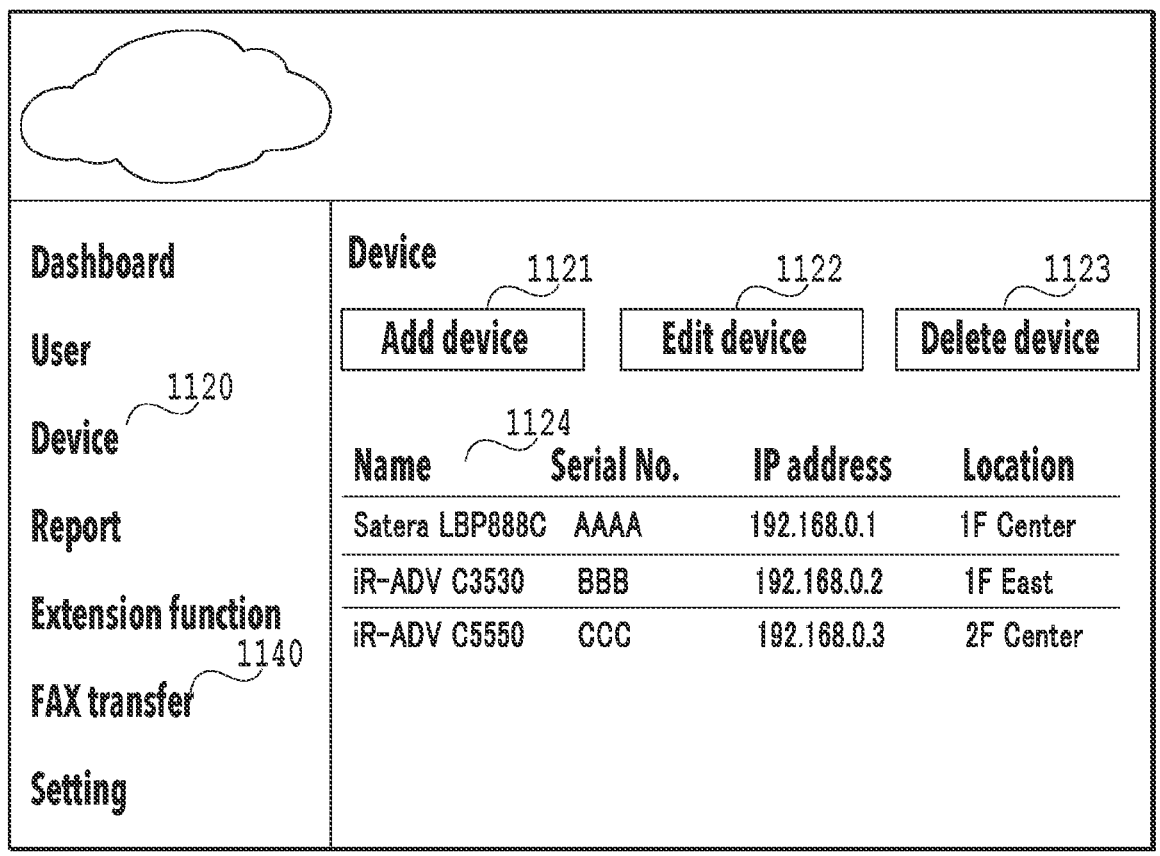
FIG. 11A to FIG. 11C are each a diagram showing an example of a user interface screen relating to various functions provided by a relay server.
Figure 11B:
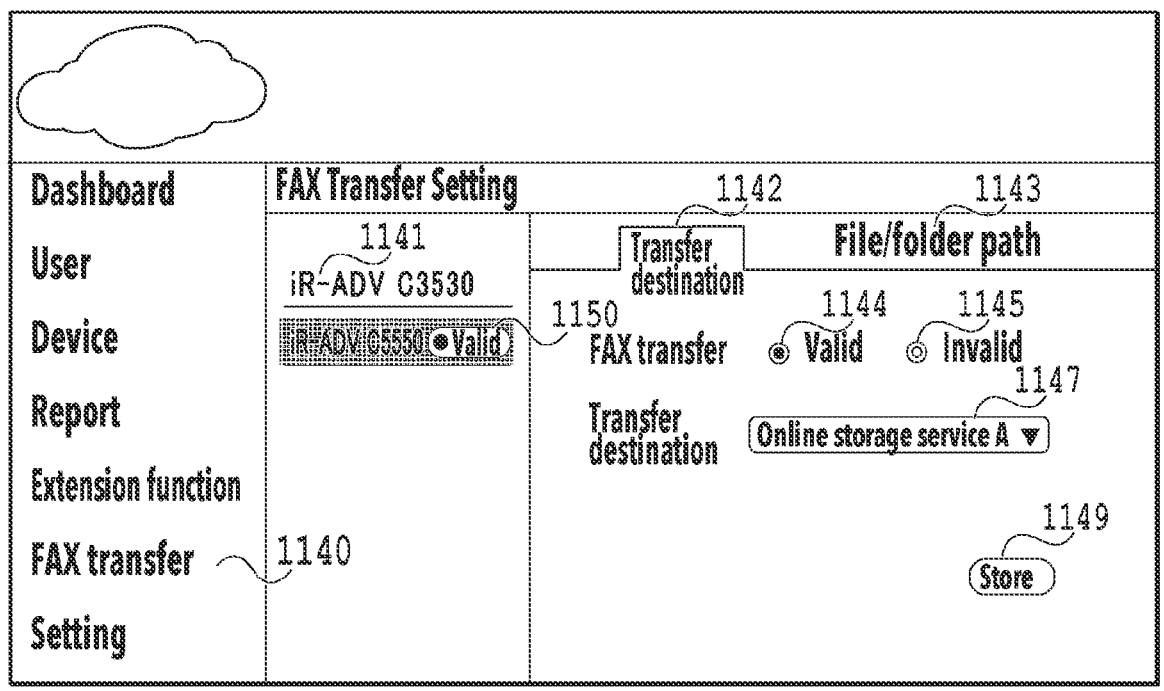
Figure 11C:
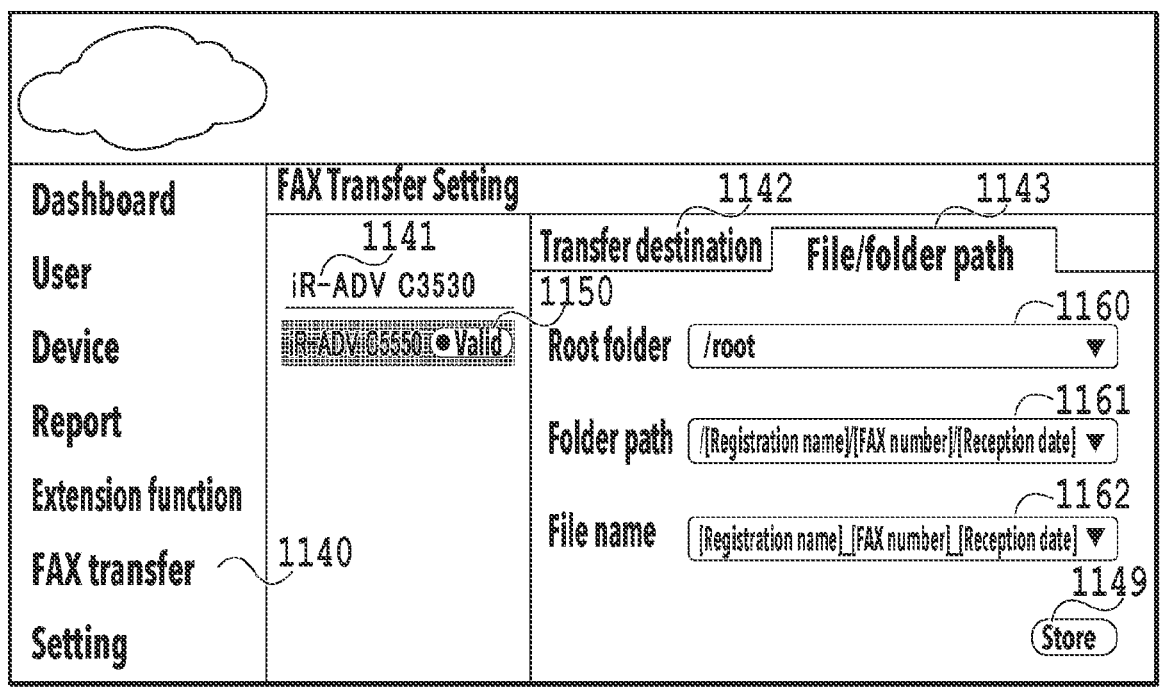

FIG. 11A to FIG. 11C are each an example of a UI screen for performing the setting relating to various functions provided by the relay server 104 according to the present embodiment. These UI screens are generated by each of the applications 410 to 414 within the application 407 of the relay server 104 and the functions are provided. Further, these UI screens are displayed on a Web browser of a PC or the like, by the Web browser that operates on the PC or the like, not shown schematically, communicating with the relay server 104.

FIG. 11A is a device management screen of the device management application 411, which is displayed by clicking a "Device" item 1120. In a display field 1124, a list of devices, such as the MFP that provides the function of the relay server 104, is displayed. Above the display field 1124, an Add device button 1121, an Edit device button 1122, and a Delete device button 1123 exist. In a case where the device that provides the function is added or deleted in the relay server 104, a user presses down the Add device button 1121 or the Delete device button 1123. In a case of editing information (IP address and location) on the registered device, a user presses down the Edit device button 1122. The relay server 104 provides functions to the group of registered devices, such as authentication of a user who can utilize, creation and visualization of the record of utilization of printing and scan in each device, and FAX transfer.

<<FAX Transfer Setting Screen>>

FIG. 11B is a FAX transfer setting screen that is displayed by clicking a "FAX transfer" item 1140. In a transfer destination list 1141, devices having the FAX function among the devices registered in the relay server 104 are displayed. For the device whose FAX transfer function has been validated, a Valid label 1150 is displayed. In a case of editing or referring to the FAX transfer setting of each device, a user selects the relevant device from the transfer destination list 1141. Here, explanation is given on the assumption that the device whose name is "iR-ADV C5550" is selected.

In the state where a Transfer destination tab 1142 is selected, a Valid button 1144 is a radio button that is used at the time of validating the FAX transfer function for the selected device. An invalid button 1145 is a radio button that is used at the time of invalidating the FAX transfer function for the selected device. In a selection field 1147, a cloud service that is the transfer destination of the FAX image data received from the selected device is designated. From candidates of various cloud services (the online storage 105 and the mail server 106) presented in a pulldown menu, a user selects the cloud service of the transfer destination. In a case where a Store button 1149 is pressed down, the setting of the FAX transfer function for the selected device is settled and the contents that are input, selected, and the like at that point in time are stored.

FIG. 11C shows the state where a File/folder path tab 1143 is selected. Here, the rule of a folder path and a file name for the FAX image data that is transferred to the cloud service designated in the selection field 1147 in FIG. 11B is set. To a Root folder setting field 1160, the starting point of a folder path for specifying the storage destination of the FAX image data is input.

To a Folder path selection field 1161, the setting rule of a folder path for specifying the folder, which is the storage destination of the transfer-target FAX image data, is input. Here, it is possible to set a folder path that combines three kinds of information, that is, [Registration name], [FAX number], and [Reception date] as explained on the Folder Path Setting screen 900. Here, the example is shown in which the first to third hierarchies are set, but is possible to select all the combinations or part of the combinations, such as that only the first hierarchy is set and that the first and second hierarchies are set, from a pulldown menu. In addition, it may also be possible to enable to set a file name that combines information (for example, the name of the device and the like) that can be used in the relay server 104, or to directly receive the input from a user.

To a File name selection field 1162, the setting rule of a file name that is set to the transfer-target FAX image data is input. Here, it is possible to set a file name that combines three kinds of information, that is, [Registration name], [FAX number], and [Reception date] as explained on the File Name Setting screen 800 and it is possible to select all the arrangement orders or part of the arrangement orders from a pulldown menu. In addition, it may also be possible to enable to set a file name that combines information (for example, the name of the device and the like) that can be used in the relay server 104, or to directly receive the input from a user. In a case where the Store button 1149 is pressed down, the setting of the FAX transfer function for the selected device is settled and the contents that are input, selected, and the like at that point in time are stored.

It may also be possible to adopt a configuration in which in a case where the service of the mail server 106 is selected in the selection field 1147, the Root folder setting field 1160 and the Folder path selection field 1161 are not displayed. Further, it may also be possible to adopt a configuration in which in a case where the service of the online storage 105 for which it is not possible to designate a folder is selected in the selection field 1147 as well, the Root folder setting field 1160 and the Folder path selection field 1161 are not displayed.

<FAX Transfer Setting Processing of MFP>

Figure 12A:
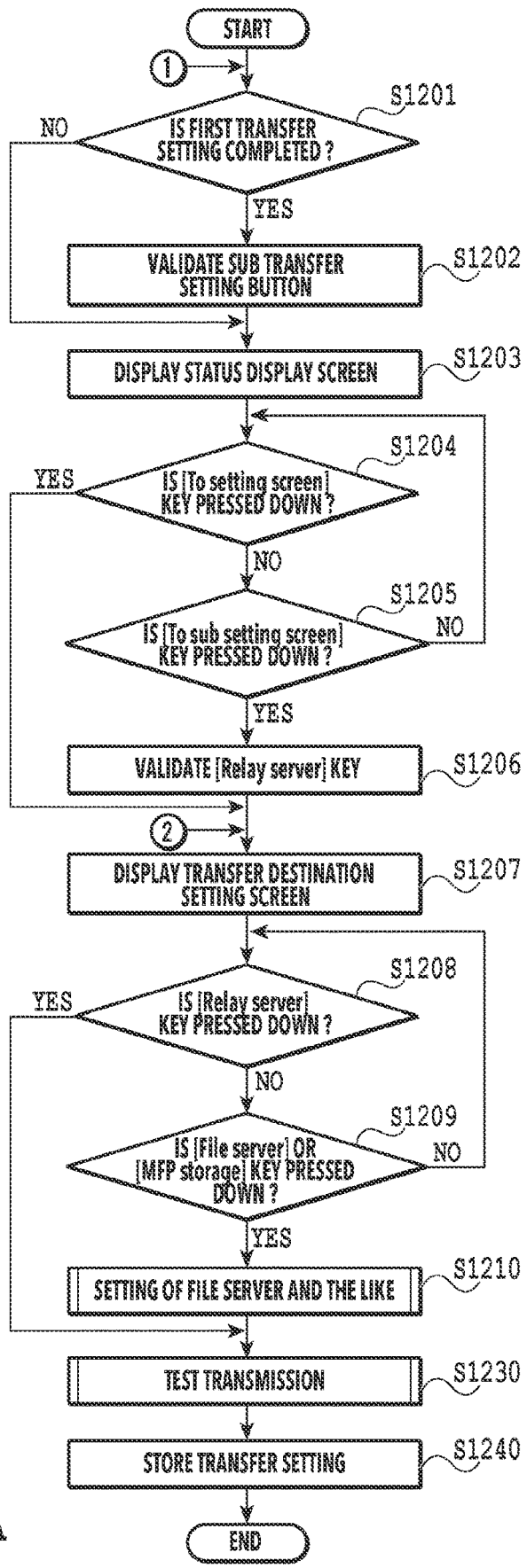
FIG. 12A to FIG. 12C are each a flowchart showing a flow of transfer setting in an MFP.

FIG. 12A is a flowchart for explaining the setting operation for transferring the FAX image data received by the MFP 101 to the transfer destination (the file server 102, the storage function unit 315, or the relay server 104) according to the present embodiment. Each operation (step) shown in the flowchart in FIG. 12A is implemented by the CPU 211 of the MFP 101 executing a control program stored in the HDD 214. In the following explanation, symbol "S" means a step.

At S1201, whether the first transfer setting is completed is determined. In a case where the first transfer setting is completed, at S1202 that follows, the [To sub transfer setting screen] key 503 is validated (changed to the state where selection is possible) and the processing advances to S1203. In a case where the first transfer setting is not completed, the processing advances to S1203 while leaving the [To sub transfer setting screen] key 503 invalid (the state where selection is not possible is maintained).

At S1203, the Status Display screen 500 (FIG. 5) is displayed on the operation unit 220. At this time, in a case where the first transfer setting is not completed, the [To sub transfer setting screen] key 503 within the Status Display screen 500 is in the state where user selection is not possible. On the other hand, in a case where the first transfer setting is completed, the [To sub transfer setting screen] key 503 is in the state where user selection is possible.

At S1204, whether or not the [To transfer setting screen] key 502 on the Status Display screen 500 is pressed down is determined. In a case where the [To transfer setting screen] key 502 is not pressed down, at S1205, whether or not the

[To sub transfer setting screen] key 503 is pressed down is determined. In a case where none of the key 502 and the ley 503 is pressed down, the processing returns to S1204. This means a standby status until the key 502 or the key 503 is pressed down. In a case where the pressing down of the [To transfer setting screen] key 502 is detected, the processing advances to S1207. In a case where the [To sub transfer setting screen] key 503 is pressed down, at S1206, the [Relay server] key 603 is validated (the non-displayed state is changed to the displayed state) and the processing advances to S1207.

At S1207, the Transfer Destination Setting screen 600 (FIG. 6B) is displayed on the operation unit 220.

At S1208, whether or not the [Relay server] key 603 is pressed down is determined. In a case where the [Relay server] key 603 is not pressed down, at S1209, whether or not another key (the [File server] key 601 or the [MFP storage] key 602) is pressed down is determined. In a case where none of the keys is pressed down, the processing returns to S1208. This means a standby status until one of the keys 601 to 603 is pressed down. In a case where the [Relay server] key 603 is pressed down, the processing advance to S1230 by taking the transfer destination to be the relay server 104. In a case where it is determined that another key is pressed down, the processing advances to S1210 and the processing of the file server and the like is performed. In the following, with reference to the flowchart in FIG. 12B, the setting processing of the file server and the like at S1210 is explained.

<<Setting Processing of File Server and the Like>>

At S1211, the File Server Setting screen 700 (FIG. 7A) or the MFP Storage Setting screen 710 (FIG. 7B) is displayed on the operation unit 220.

At S1212, whether or not a [Cancel] key 711 is pressed down is determined. In a case where the [Cancel] key 711 is pressed down, the processing returns to S1201 and the Status Display screen 500 is displayed. In a case where the [Cancel] key 711 is not pressed down, the processing advances to S1212 and whether or not a [Next] key 712 is pressed down is determined. In a case where the [Next] key 712 is pressed down, the processing advances to S1214. In a case where the [Next] key 712 is not pressed down, the processing returns to S1212.

At S1214, the File Name Setting screen 800 (FIG. 8) is displayed on the operation unit 220.

At S1215, whether or not a [Cancel] key 821 is pressed down is determined. In a case where the [Cancel] key 821 is pressed down, the processing returns to S1201 and the Status Display screen 500 is displayed. In a case where the [Cancel] key 821 is not pressed down, the processing advances to S1216 and whether or not a [Back] key 822 is pressed down is determined. In a case where the [Back] key 822 is pressed down, the processing returns to S1211 and the File Server Setting screen 700 or the MFP Storage Setting screen 710 is displayed. In a case where the [Back] key 822 is not pressed down, the processing advances to S1217 and whether or not a [Next] key 823 is pressed down is determined. In a case where the [Next] key 823 is pressed down, the processing advances to S1218. In a case where the [Next] key 823 is not pressed down, the processing returns to S1215.

At S1218, the Folder Path Setting screen 900 (FIG. 9) is displayed on the operation unit 220.

At S1219, whether or not a [Cancel] key 921 is pressed down is determined. In a case where the [Cancel] key 921 is pressed down, the processing returns to S1201 and the Status Display screen 500 is displayed. In a case where the [Cancel] key 921 is not pressed down, the processing advances to S1220 and whether or not a [Back] key 922 is pressed down is determined. In a case where the [Back] key 922 is pressed down, the processing returns to S1214 and the File Name Setting screen 800 is displayed. In a case where the [Back] key 922 is not pressed down, the processing advances to S1221 and whether or not a [Next] key 923 is pressed down is determined. In a case where the [Next] key 923 is pressed down, the processing at S1210 is terminated and the processing advances to S1230. In a where the [Next] key 923 is not pressed down, the processing returns to S1219.

<<Test Transmission Processing>>

S1230 is the test transmission processing. In the following, with reference to the flowchart in FIG. 12C, the test transmission processing is explained.

At S1231, the Test Transmission screen 1000 (FIG. 10A) is displayed on the operation unit 220. It is possible for a user of the MFP 101 to perform test transmission to the transfer destination (the file server 102, the storage function unit 315, or the relay server 104) via the Test Transmission screen 1000.

At S1232, whether or not the [Test transmission] key 1012 is pressed down is determined. In a case where the [Test transmission] key 1012 is pressed down, the processing advances to S1233 and in a case where the [Test transmission] key 1012 is not pressed down, the processing advances to S1234.

At S1233, the test transmission is performed based on the contents of FAX number 1001 and Reception date 1002 and the contents that are set on the UI screens in FIG. 6A to FIG. 9.

At S1234, whether or not a [Cancel] key 1021 is pressed down is determined. In a case where the [Cancel] key 1021 is pressed down, the processing returns to S1201 and the Status Display screen 500 is displayed. In a case where the [Cancel] key 1021 is not pressed down, the processing advances to S1235 and whether or not a [Back] key 1022 is pressed down is determined. In a case where the [Back] key 1022 is pressed down, the processing advances to S1236. At S1236, whether or not the transfer destination designated on the Transfer Destination Setting screen 600 displayed at S1207 is the relay server 104 is determined. In a case where the designated transfer destination is the relay server 104, the processing returns to S1207 and the Transfer Destination Setting screen 600 is displayed. In a case where the designated transfer destination is not the relay server 104 (the file server 102 or the storage function unit 315), the processing returns to S1218 and the Folder Path Setting screen 900 is displayed. In a case where the [Back] key 1022 is not pressed down, the processing advances to S1237 and whether or not an [OK] key 1023 is pressed down is determined. In a case where the [OK] key 1023 is pressed down, the processing at S1230 is terminated and the processing advances to S1240. In a case where the [OK] key 1023 is not pressed down, the processing returns to S1232.

Lastly, at S1204, the contents of the transfer settings that are input in each piece of the processing so far are stored in the HDD 214. In the flowchart in FIG. 12A, the transfer settings are stored after performing the test transmission, but it may also be possible to adopt a configuration in which the test transmission is omitted and the transfer settings are stored.

<<Summary of FAX Transfer Setting>>

Figure 12B:
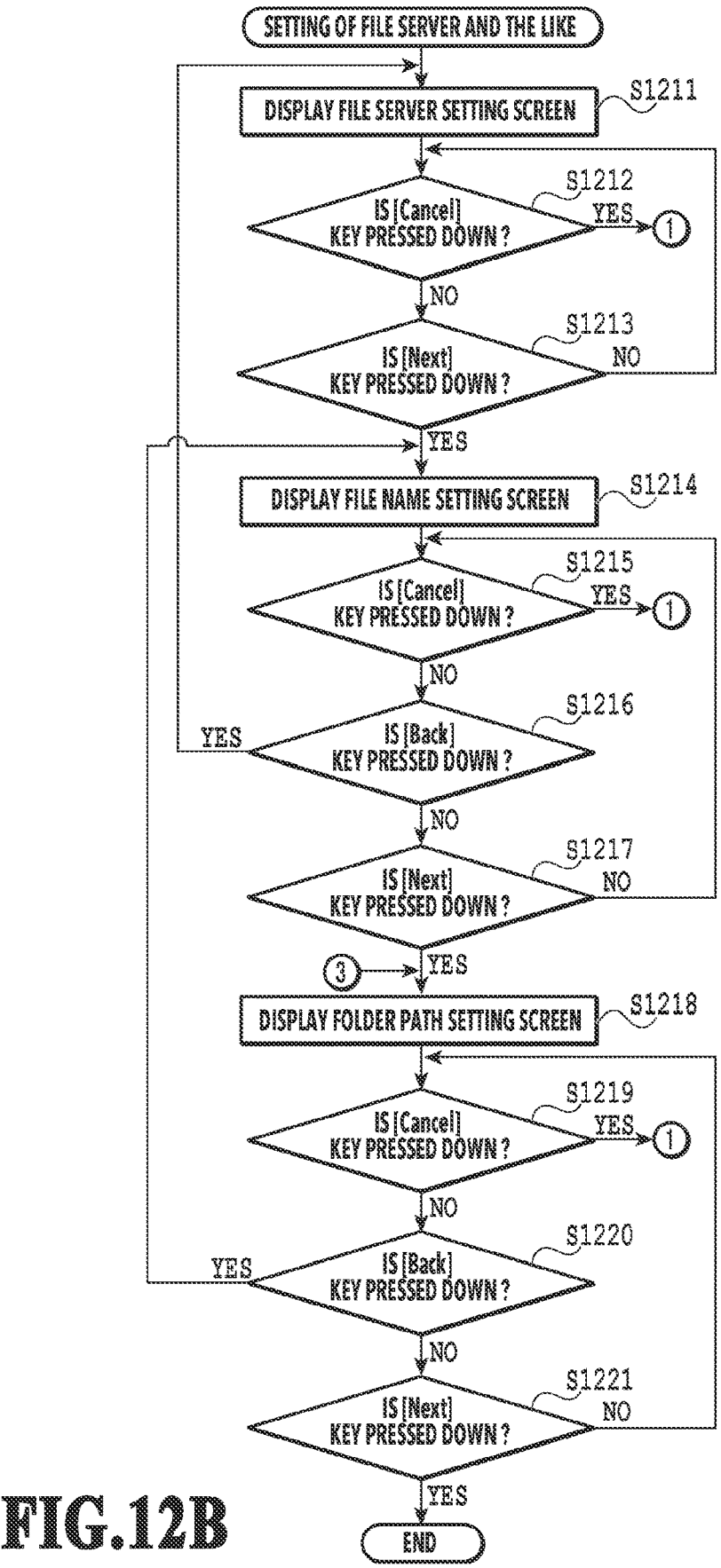
Figure 12C:
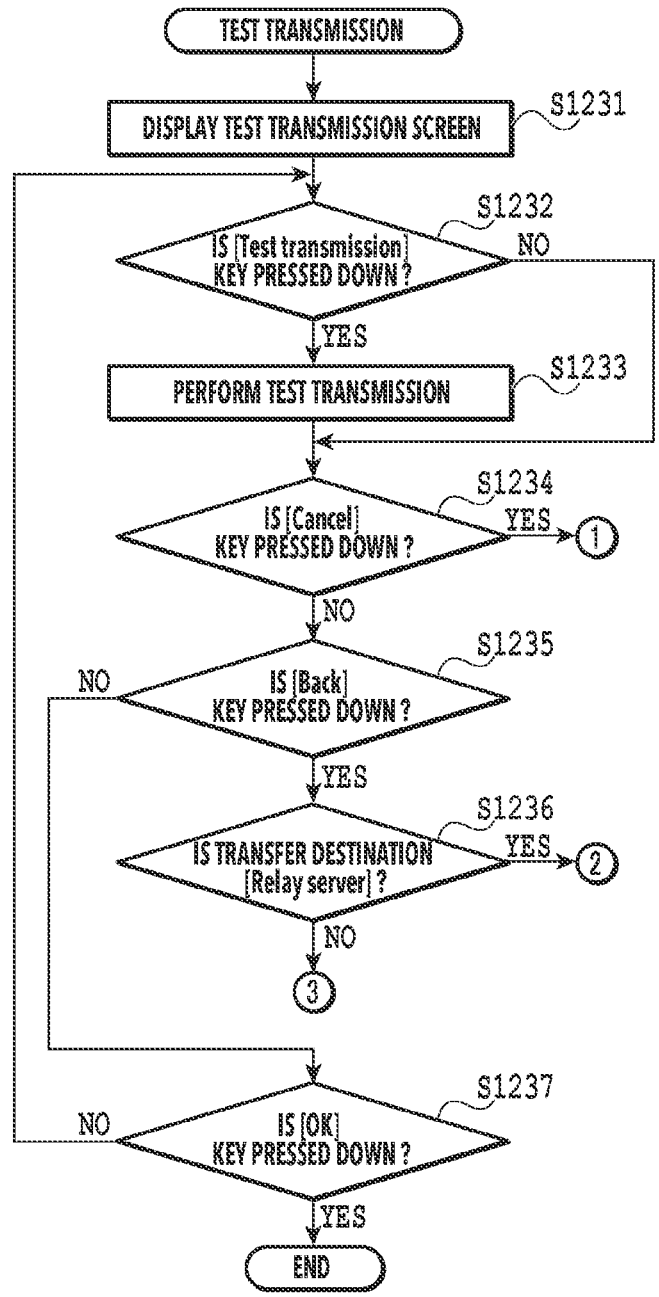

As explained by using the flowcharts in FIG. 12A to FIG. 12C, in the stage where the first transfer setting is not completed, the display control of the UI screen is performed so that only the input relating to the first transfer setting is received the input relating to the second transfer setting cannot be performed. In the first transfer setting, it is possible for a user to designate the file server 102 or the storage function unit 315 as the transfer destination and the transfer setting that takes the transfer destination to be the relay server 104 is not stored first. At the time of performing the second and subsequent transfer settings, the Status Display screen 500 shown in FIG. 5B on which it is possible to select the [To sub transfer setting screen] key 503 is displayed. Then, only at the time of the second transfer setting, it is made possible to select the relay server 104 as the transfer destination on the Transfer Destination Setting screen 600 shown in FIG. 6B (the [Relay server] key 603 is displayed]. By the processing such as this, in a case where the transfer destination is set to the relay server 104, another transfer setting designating a transfer destination other than the relay server 104 is performed without exception.

<Transfer Processing Procedure in MFP>

Figure 13A:
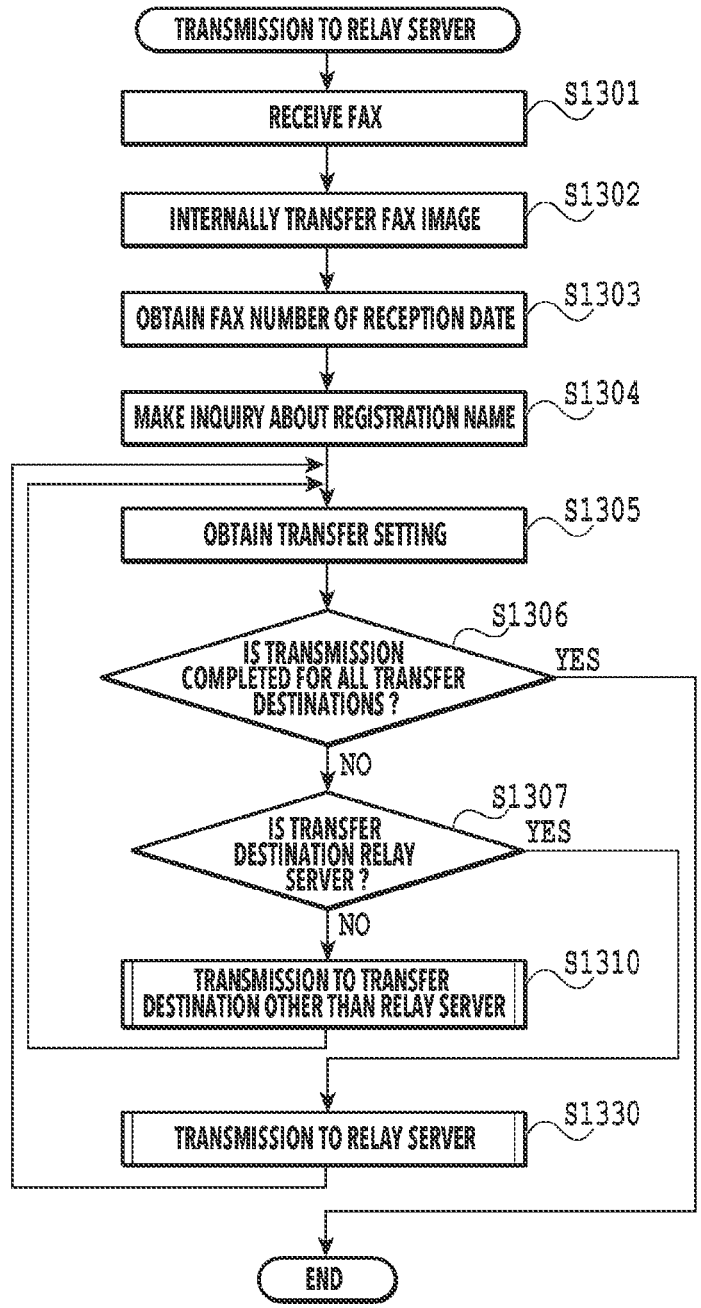
FIG. 13A to FIG. 13C are each a flowchart showing a flow of transfer processing in an MFP.

FIG. 13A is a flowchart explaining the operation of the MFP 101 to transfer the received FAX image data to the transfer destination (the file server 102, the storage function unit 315, or the relay server 104) designated by a user. Each operation (step) shown in the flowchart in FIG. 13A is implemented by the CPU 211 of the MFP 101 executing a control program stored in the HDD 214. In the following explanation, symbol "S" means a step.

At S1301, the FAX reception unit 411 receives document image data by a facsimile. At S1302, the transfer unit 412 internally transfers the document image data (FAX image data) received by a facsimile to the application reception unit 422 by the FTP. At S1303, the application transfer unit 421 obtains the FAX number and the reception date of the transmission source from the control file that is transferred along with the FAX image data.

At S1304, the application transfer unit 421 makes an inquiry about the name registered in association with the FAX number of the transmission source to the address book storage unit 414.

At S1305, one transfer setting stored in the HDD 214 by the FAX transfer setting processing described previously is obtained. Here, there is a possibility that a plurality of transfer settings is stored. At S1306 that follows, whether or not the transfer processing is performed for all the transfer settings is determined. In a case where the transfer processing is performed for all the transfer settings, this processing is terminated. In a case where there is a transfer setting for which the transfer processing has not been performed yet (that is, in a case where it is possible to obtain the transfer setting in the processing at S1305), the processing advances to S1307.

At S1307, whether or not the transfer destination designated in the transfer setting obtained at S1305 is the relay server 104 is determined. In a case where the transfer destination is not the relay server 104, that is, the transfer destination is the file server 102 or the storage function unit 315, the processing advances to S1310. In a case where the transfer destination is the relay server 104, the processing advances to S1330. In a case where the processing at S1310 or at S1330 is completed, the processing returns to S1305 and an attempt to obtain the next transfer setting is made. The processing such as this is repeated until the transfer processing is completed for all the transfer settings.

<<<Transfer Processing to Destination Other than Relay Server>>>

Figure 13B:
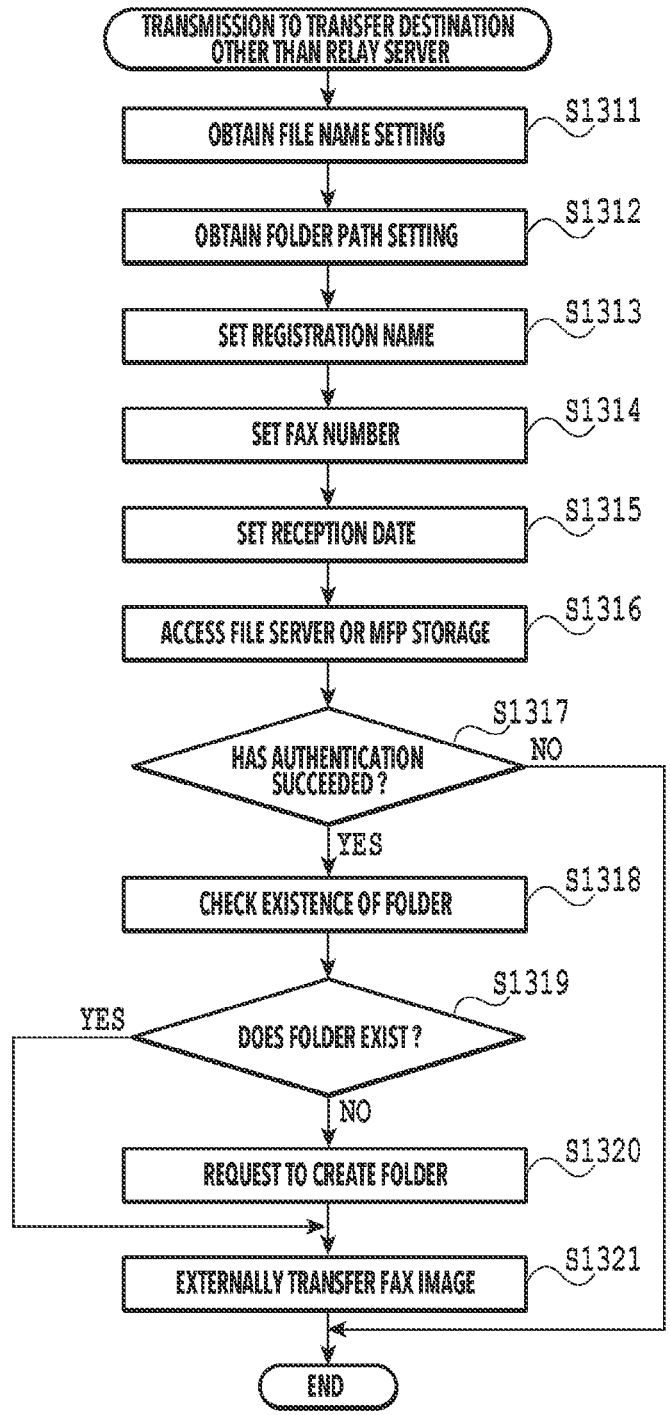

S1310 is the transfer processing to a destination other than the relay server 104. In this transfer processing, in accordance with the setting information included in the transfer setting obtained at S1305 by the application transfer unit 421, a folder path and a file name are created and image data is transmitted to the file server 102 or the storage function unit 315. Here, the transfer processing to a destination other than the relay server 104 is explained with reference to the flowchart in FIG. 13B on the assumption that image data is transmitted to the file server 102.

At S1311, a file name setting included in the transfer setting obtained at S1305 by the application transfer unit 421 is obtained. Following this, at S1312, a folder path setting included in the transfer setting obtained at S1305 by the application transfer unit 421 is obtained.

At S1313, the application transfer unit 421 sets the registration name obtained at S1304 as part of the file name and the folder path in accordance with the file name setting and the folder path setting obtained at S1311 and S1312. In a case where obtaining of the registration name has failed (for example, in a case where the FAX number of the transmission source is not registered in the address book), a default name is set as part of the file name and the folder path. The default name is, for example, a character string, such as "not available".

At S1314, the application transfer unit 421 sets the FAX number obtained at S1303 as part of the file name and the folder path in accordance with the fine name setting and the folder path setting obtained at S1311 and S1312.

At S1315, the application transfer unit 421 sets the reception date obtained at S1303 as part of the file name and the folder path in accordance with the file name setting and the folder path setting obtained at S1311 and S1312.

By the processing so far, the folder path and the file name that are used at the time of transmitting the FAX image data to the file server 102 are created. At the subsequent steps, by using the folder path and the file name, which are created, the FAX image data is transmitted to the file server 102.

At S1316, the application transfer unit 421 accesses the file server 102. At this time, the application transfer unit 421 transmits the user name and the password included in the transfer setting obtained at S1305 to the file server 102 and receives results of authentication by the file server 102. At S1317, the application transfer unit 421 determines whether or not the authentication has succeeded (whether it has been possible to log in to the file server 102) and in a case where the authentication has succeeded, the processing advances to S1318 and in a case where the authentication has failed, the processing at S1310 is terminated.

At S1318, the application transfer unit 421 checks whether or not the folder indicated by the folder path exists (makes inquiry to the file server 102). At S1319, the application transfer unit 421 branches the processing in accordance with whether the relevant folder exists. In a case where the relevant folder exists, the processing advances to S1321 and in a case where the relevant folder does not exist, the processing advances to S1320.

At S1320, the application transfer unit 421 requests the file server 102 to create the folder indicated by the folder path.

At S1321, the application transfer unit 421 externally transfers the FAX image data to the file server 102. At this time, the FAX image data is stored in the folder indicated by the folder path described previously with the file name described previously being attached.

<<Transfer Processing to Relay Server>>

Figure 13C:
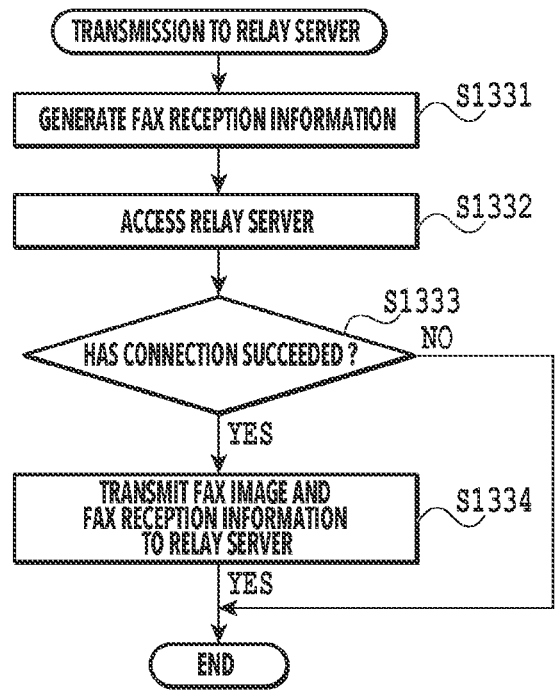

S1330 is the transfer processing to the relay server 104. In the following, with reference to the flowchart in FIG. 13C, the transfer processing to the relay server 104 is explained.

At S1331, the application transfer unit 421 generates FAX reception information that is transmitted to the relay server 104. In the FAX reception information, at least the FAX number and the reception date obtained at S1303 and the registration name obtained at S1304 are included.

At S1332, the application transfer unit 421 accesses the relay server 104.

At S1333, the application transfer unit 421 determines whether or not the connection to the relay server 104 has succeeded and in a case where the connection has succeeded, the processing advances to S1334 and in a case where the connection has failed, the processing at S1330 is terminated.

At S1334, the FAX image data and the FAX reception information generated at S1331 are transmitted to the file server 102 and the processing at SI 330 is terminated.

<<Transfer Processing Procedure in Relay Server>>

Figure 14:
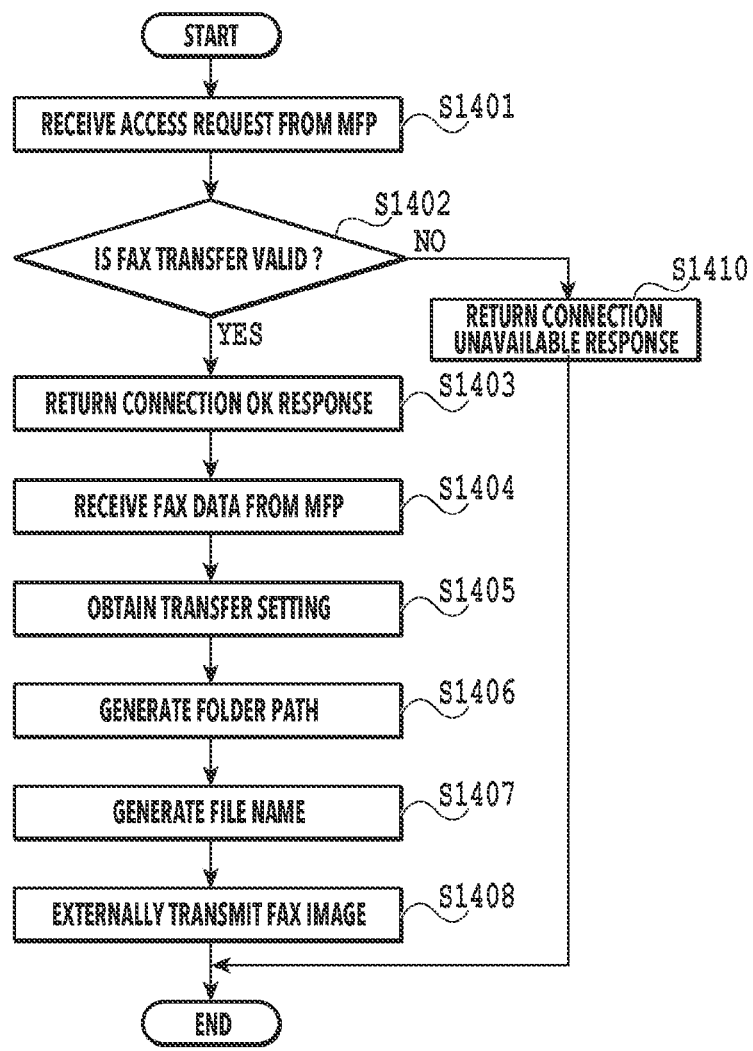
FIG. 14 is a flowchart showing a flow of transfer processing in a relay server.

Following the above, the transfer processing procedure in the relay server 104 having received the FAX image data from the MFP 101 is explained. FIG. 14 is a flowchart explaining the operation of the relay server 104 to transfer the FAX image data received from the MFP 101 to the transfer destination (the online storage 105 or the mail server 106). Each operation (step) shown in the flowchart in FIG. 14 is performed by the infrastructure 401 of the relay server 104 executing a control program, such as each application 407. In the following explanation, symbol "S" means a step.

At S1401, the FAX management application 414 receives an access request from the application transfer unit 421 of the MFP 101. This processing is the processing corresponding to S1332 described previously in the MFP 101.

At S1402, the FAX management application 414 determines whether the MFP 101 having transmitted the access request is a device whose FAX transfer function has been validated. In a case where the FMP 101 is a device whose FAX transfer function has been validated, the FAX management application 414 returns a connection OK response to the MFP 101 at S1403 and the processing advances to S1404. In a case where the MFP 101 is a not a device whose FAX transfer function has been validated, the FAX management application 414 returns a connection unavailable response to the MFP 101 at S1410 and terminates the processing.

At S1404, the FAX management application 414 receives FAX image data and FAX reception information from the FMP 101. This processing is the processing corresponding to S1334 described previously in the MFP 101.

At S1405, the FAX management application 414 obtains the FAX transfer setting in association with the MFP 101. The FAX transfer setting is the setting contents of each setting item explained in FIG. 11B and FIG. 11C. For example, the FAX transfer setting refers to the transfer destination cloud service designated in the selection field 1147, the naming rule of the folder paths designated in the Root folder setting field 1160 and the Folder path selection field 1161, the naming rule of the file name designated in the File name selection field 1162, and the like.

At S1406, the FAX management application 414 generates a folder path in accordance with the FAX transfer setting obtained at S1405. Specifically, the FAX management application 414 sets the FAX number, the reception date, the registration name and the like included in the FAX reception information received from the MFP 101 at S1404 as part of a folder path and determines the folder path. In a case where the transfer destination is the mail server 106 or in a case of the online storage 105 for which it is not possible to designate a folder, this processing may be omitted.

At S1407, the FAX management application 414 generates a file name in accordance with the FAX transfer setting obtained at S1405. Specifically, the FAX management application 414 sets the FAX number, the reception date, the registration name and the like included in the FAX reception information received from the MFP 101 at S1404 and determines the file name.

At S1408, the FAX management application 414 externally transfers the FAX image data to the cloud service. At this time, the FAX image data is stored in the folder indicated by the folder path described previously with the file name described previous being attached. Of course, as explained at S1318 to S1320, it may also be possible to check the presence/absence of the folder of the transfer destination and in a case where the folder of the transfer destination does not exist, externally transfer the FAX image data after transmitting a folder creation request to the cloud service.

Modification Example

In the above-described embodiment, the case is explained as an example where the transfer destination of the transfer processing performed by the additional application 320 is set to one of the file server 102, the MFP storage (the storage function unit 315), and the relay server 104. The transfer destination is not limited to those and, for example, it may also be possible to set the online storage 105 or the mail server 106 as the transfer destination. In that case, it may also be possible to handle the online storage 105 and the mail server 106 as in the case of the file server 102 and the MFP storage or it may also be possible to handle the online storage 105 and the mail server 106 as in the case of the relay server 104. For example, the configuration may be one in which it is possible to select the online storage 105 or the mail server 106 as the first transfer destination or the configuration may be one in which it is possible to select the online storage 105 or the mail server 106 as only the second transfer destination, like the relay server.

In the above-described embodiment, explanation is given by taking the transfer of the FAX image data exclusively as an example, but the transfer target may be another kind of data, for example, the scanned image data obtained by the scan of the scanner 222, the print image data used in the printer 221, and the like.

As above, according to the present embodiment, at the time of setting the relay system as the transfer destination of image data in the MFP, it is mandatory to set the storage server or the like other than the relay system as another transfer destination without exception. Due to this, even in a case where a failure has occurred in the relay system or the cloud service, it is possible to prevent the image data transferred from the MFP from being lost.

Second Embodiment

In the first embodiment, the display control of the transfer setting UI screen is performed so that it is possible to designate the relay server 104 as the transfer destination only in the second and subsequent transfer settings. Next, an aspect is explained as a second embodiment in which the display control of the transfer setting UI screen is performed so that the same operation and effect as those of the first embodiment are obtained while permitting a user to first designate the relay server 104 as the transfer destination.

<Outline of the Second Embodiment>

Figure 15A:
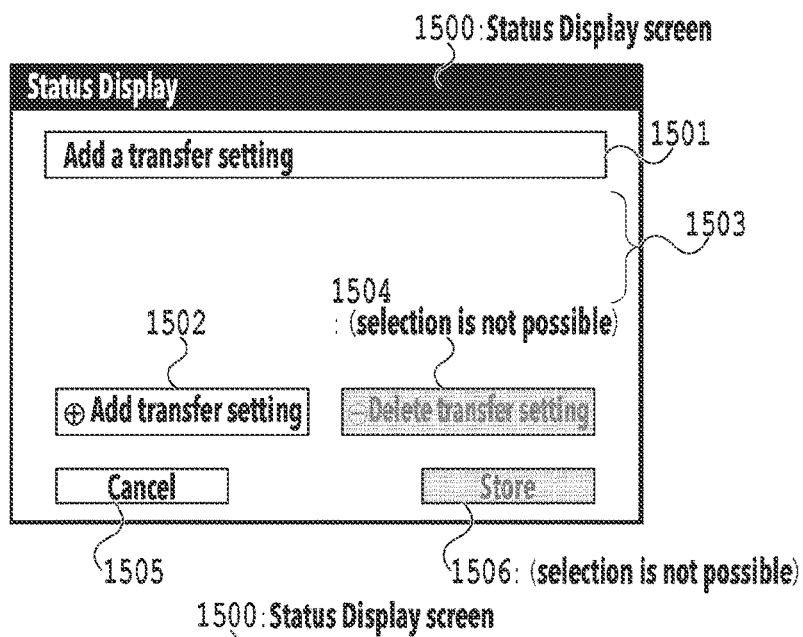
FIG. 15A to FIG. 15C are each a diagram showing an example of a user interface screen relating to a FAX transfer function.
Figure 15B:
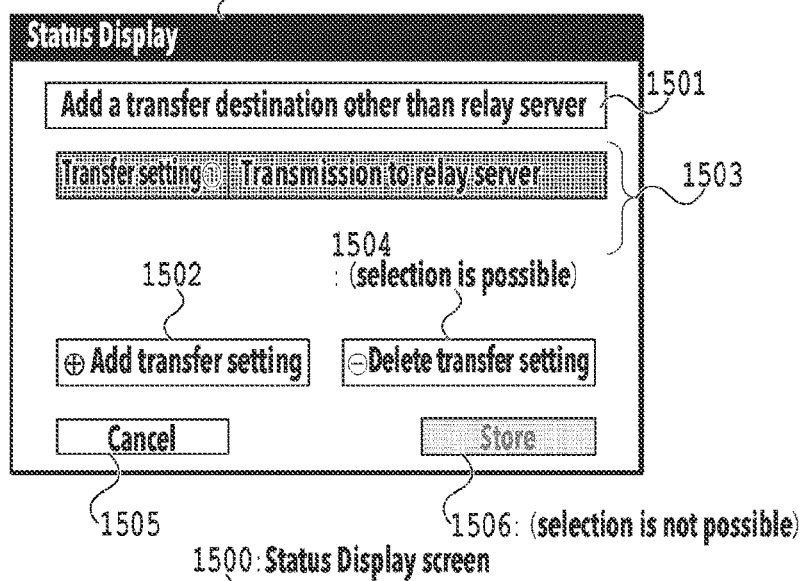
Figure 15C:
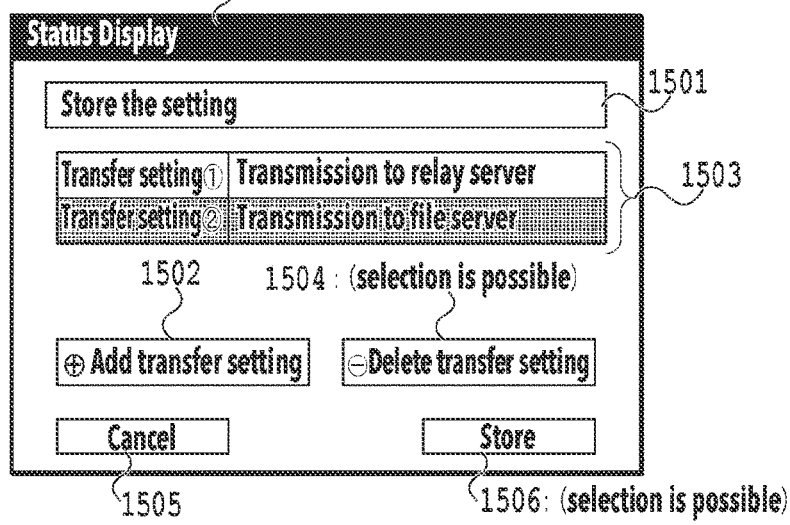
Figure 16A:
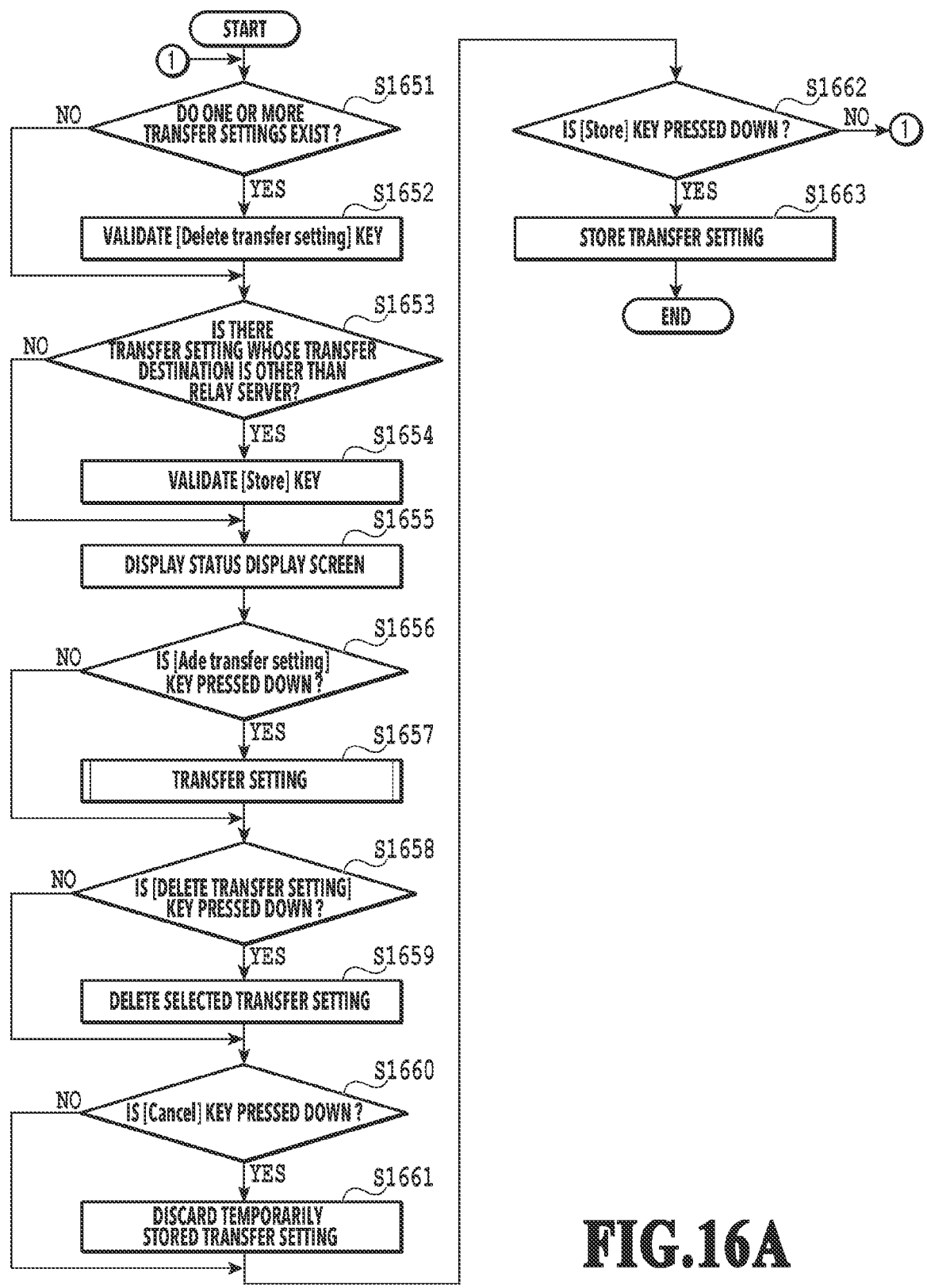
FIG. 16A and FIG. 16B are each a flowchart showing a flow of transfer setting in an MFP.
Figure 16B:
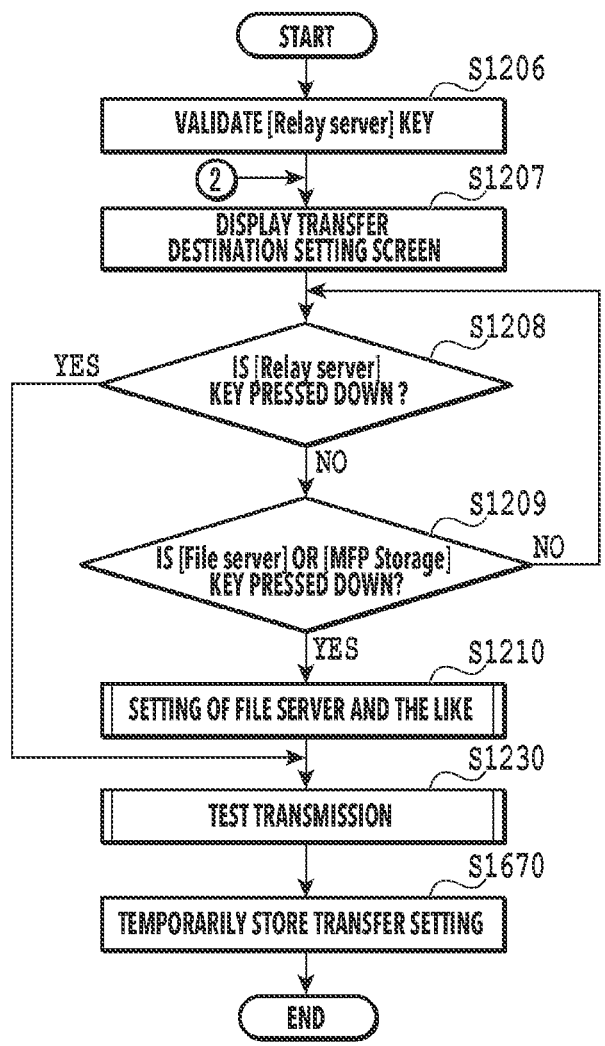

In the present embodiment, in place of the Status Display screen 500 shown in FIG. 5A and FIG. 5B, a Status Display screen 1500 shown in FIG. 15A to FIG. 15C is displayed. Further, in place of the flowcharts of the transfer setting processing procedure shown in FIG. 12A to FIG. 12C, flowcharts of the transfer setting processing procedure shown in FIG. 16A and FIG. 16B are performed. The other configurations are the same as those explained in the first embodiment, and therefore, explanation is omitted.

<Status Display Screen>

FIG. 15A to FIG. 15C are each an example of a status display screen according to the present embodiment. In a status display area 1501 on the Status Display screen 1500 shown in FIG. 15A, a message indicating the operation status of the current FAX transfer function, a guide relating to the transfer setting, or the like is displayed. In the example shown schematically in FIG. 15A, the transfer setting is not performed, and therefore, a message indicating the status where addition of a setting is necessary is displayed.

In a case where an [Add transfer setting] key 1502 is pressed down, the Transfer Destination Setting screen 600 including the [Relay server] key 603 as shown in FIG. 6B is displayed.

In a transfer setting list 1503, a list of the stored (applied) or temporarily stored transfer setting is displayed. In the example schematically shown in FIG. 15A, the state is such that no transfer setting is performed, and therefore, nothing is displayed. In a case where a transfer setting is added, as schematically shown in FIG. 15B and FIG. 15C, the transfer setting whose designation of the transfer destination and the like is completed is displayed in a list. Each transfer setting displayed in the list in the transfer setting list 1503 can be selected. In a case where a desired transfer setting is selected and then a [Delete transfer setting] key 1504 is pressed down, the deletion of the transfer setting currently being selected is performed. The display control of the [Delete transfer setting] key 1504 is performed so that it is not possible to select the [Delete transfer setting] key 1504 in a case where no transfer setting exists.

In a case where a [Cancel] key 1505 is pressed down, the temporarily stored transfer setting is discarded.

In a case where a [Store] key 1506 is pressed down, the temporarily stored transfer setting is stored (applied). The display control of the [Store] key 1506 is performed so that it is not possible to select the [Store] key 1506 in a case where no transfer setting exists or in a case where only the relay server 104 is designated as the transfer destination of the transfer setting.

<FAX Transfer Setting Processing of MFP>

FIG. 16A is a flowchart explaining the setting operation for transferring the FAX image data received by the MFP 101 to the transfer destination (the file server 102, the storage function unit 315, or the relay server 104). Each operation (step) shown in the flowchart in FIG. 16A is implemented by the CPU 211 of the MFP 101 executing a control program stored in the HDD 214. In the following explanation, symbol "S" means a step.

At S1651, whether or not the transfer setting whose designation of the transfer destination and the like is completed exists is determined. In a case where the transfer setting whose designation is completed exists, at S1652, the [Delete transfer setting] key 1504 is validated.

At S1653, whether or not the transfer setting in which a transfer destination other than the relay server 104 is designated is included in the transfer settings whose designation is completed is determined. In a case where the transfer setting such as this is included, at S1654, the [Store] key 1506 is validated.

At S1655, the Status Display screen 1500 in accordance with the current situation of the transfer setting (the presence/absence of the transfer setting whose designation is completed and the number of transfer settings) is displayed on the operation unit 220.

At S1656, whether or not the [Add transfer setting] key 1502 is pressed down is determined. In a case where the [Add transfer setting] key 1502 is pressed down, the processing advances to S1657 and the FAX transfer setting processing is performed. In the following, with reference to a flowchart in FIG. 16B, the transfer setting processing at S1657 is explained.

<<Transfer setting Processing>>

Each piece of the processing at S1206 to S1210 and S1230 is the same as the contents explained in the first embodiment and there is no difference, and therefore, explanation is omitted.

At S1670, the transfer setting is store temporarily and the transfer setting processing at S1657 is terminated. The temporarily stored transfer setting is displayed in the transfer setting list 1503 along with the stored (applied) transfer setting.

At S1658, whether or not the [Delete transfer setting] key 1504 is pressed down is determined. In a case where the [Delete transfer setting] key 1504 is pressed down, the transfer setting being selected in the transfer setting list 1503 is deleted.

At S1660, whether or not the [Cancel] key 1505 is pressed down is determined. In a case where the [Cancel] key 1505 is pressed down, the transfer setting temporarily stored at S1670 is deleted.

At S1662, whether or not the [Store] key 1506 is pressed down is determined. In a case where the [Store] key 1506 is pressed down, the processing advances to S1663 and in a case where the [Store] key 1506 is not pressed down, the processing returns to S1651.

At S1663, the transfer setting temporally stored at S1670 is stored in the HDD 214 and the processing is terminated.

As above, according to the present embodiment, in the FAX transfer setting processing of the MFP, the Status Display screen 1500 as shown in FIG. 15A on which it is possible to designate the relay system as the transfer destination from the beginning is displayed initially. Men, in a case where the transfer setting designating the relay server 104 as the transfer destination is performed first, the screen makes a transition into the display state shown in FIG. 15B, where the [Store] key 1506 is invalidated. After that, in a case where a transfer setting designating a transfer destination other than the relay server 104 is added, the screen makes a transition into the display state shown in FIG. 15C, where the [Store] key 1506 is validated. By the display control such as this, as in the first embodiment, it is made possible to avoid the setting of only the relay system as the transfer destination from being performed.

Third Embodiment

In the second embodiment described above, in a case where the relay server 104 is designated first as the transfer destination, it is necessary for a user to perform the transfer setting designating another transfer destination other than the relay server 104 following that. An aspect is explained as a third embodiment, in which a transfer setting designating a transfer destination other than the relay server 104 is added automatically at this time and the time and effort of a user are reduced.

The difference from the second embodiment is only part of the transfer setting processing at S1657 of the FAX transfer setting processing procedure shown in the flowchart in FIG. 16A. Consequently, explanation of those other than the transfer setting processing is omitted.

<Transfer Setting Processing>

Figure 17:
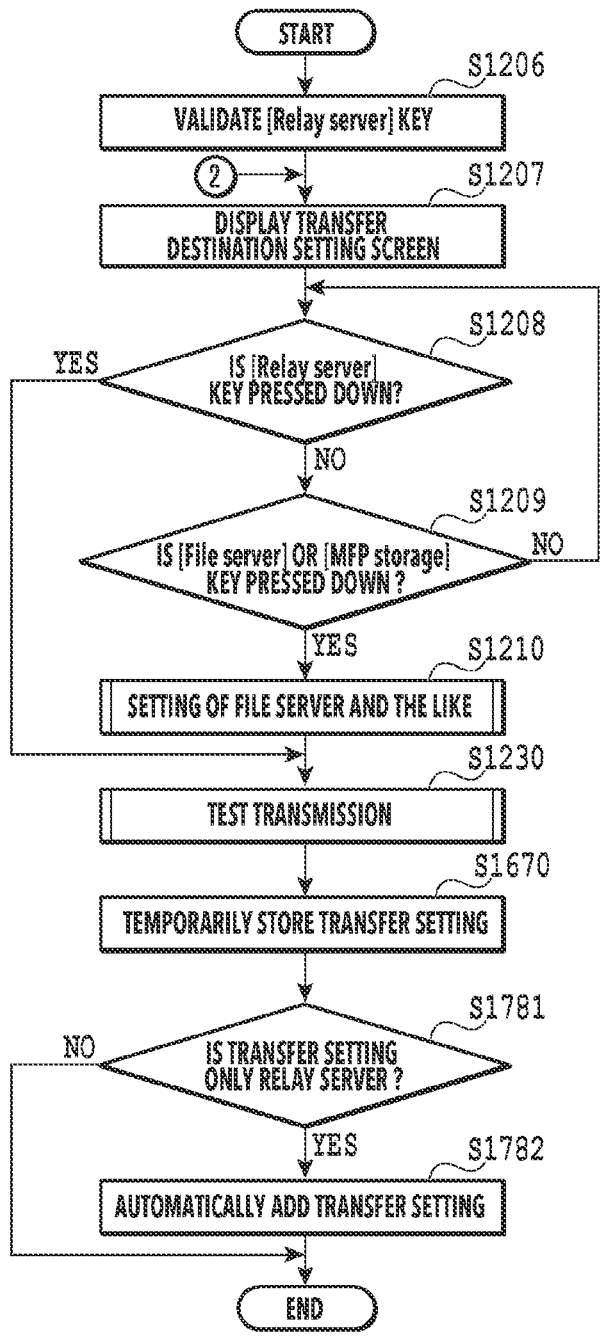
FIG. 17 is a flowchart showing details of transfer setting processing.

FIG. 17 is a flowchart showing details of the transfer setting processing according to the present embodiment. Each piece of the processing at S1206 to S1210, S1230, and S1670 are the same as the contents explained in the first and second embodiments and there is no difference, and therefore, explanation is omitted.

Figure 18:
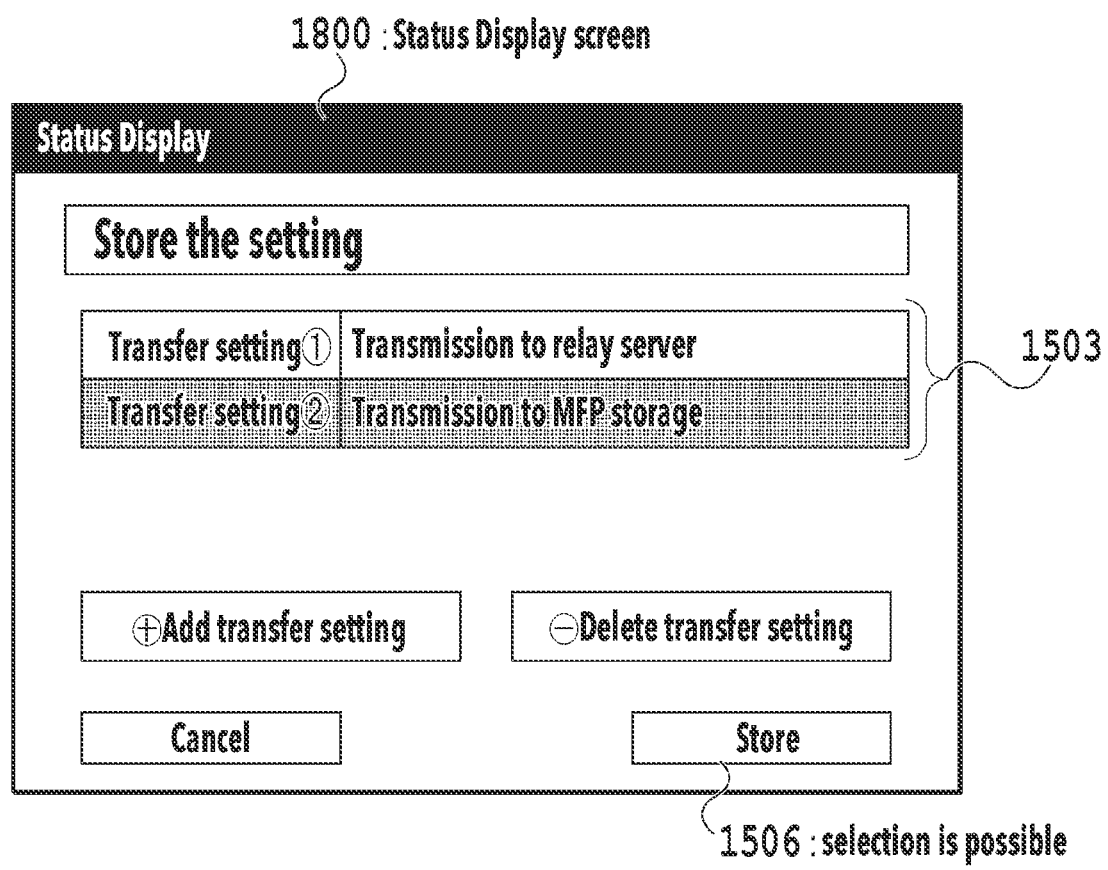
FIG. 18 is a diagram showing an example of a user interface screen relating to a FAX transfer function.

At S1781, whether or not the transfer destination designated in the transfer setting is only the relay server 104 is determined, with the transfer setting temporarily stored at S1670 being included. In a case where the transfer destination is only the relay server 104, a transfer setting designating a transfer destination other than the relay server 104 is added automatically and stored temporarily. The transfer destination other than the relay server 104 in this case is, for example, the MFP storage (the storage function unit 315). Due to this, the screen makes a transition into the state where the MFP storage server that is automatically added is automatically added in the transfer setting list 1503 as the transfer destination and the [Store] key 1506 is validated, such as a Status Display screen 1800 shown in FIG. 18.

In a case where the transfer destination other than the relay server 104, which is added automatically, is deleted by the [Delete transfer setting] key 1504, it is sufficient to perform the display control so that the [Store] key 1506 is invalidated. Alternatively, it may also be possible to fix the transfer destination in the transfer setting that is added automatically, and exclude the fixed transfer destination from the target of the deletion operation using the [Delete transfer setting] key 1504.

By doing as described above, it is possible to reduce the time and effort of a user in a case where the configuration of the second embodiment is adopted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even in a case where a failure has occurred in the relay system or the cloud service, it is possible to prevent the image data transmitted from the multi function peripheral from being lost.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-100214, filed Jun. 16, 2021 which is hereby incorporated by reference wherein in its entirety.

What is claimed is:

1. An image processing apparatus comprising:
a memory that stores a program; and
a processor that executes the program to perform:
displaying a user interface screen for causing a user to set one or more transfer destinations of image data; and
transferring the image data to the set one or more transfer destinations,
wherein, when a first transfer destination is set on the displayed user interface screen, the user interface screen on which it is not possible to set a relay system as the first transfer destination is displayed so that another transfer destination other than the relay system is set as the first transfer destination,
wherein, if a second transfer destination is set on the displayed user interface screen after the first transfer destination other than the relay system is set, the user interface screen on which it is possible to set the relay system as the second transfer destination is displayed, and
wherein the relay system is a system that further transfers received image data.

2. The image processing apparatus according to claim 1, wherein
on the user interface screen, a first button for a user to start an input relating to a first transfer setting and a second button for a user to start an input relating to a second and subsequent transfer settings exist, and
in the controlling:
in a case where the first transfer setting is not completed, the second button is invalidated; and
in a case where the first transfer setting is completed, the second button is validated.

3. The image processing apparatus according to claim 2, wherein
in the controlling, candidates of the transfer destination are displayed on the user interface screen in accordance with a user operation for the first button or the second button,
in the candidates in a case where the first button is selected, the relay system is not included, and
in the candidates in a case where the second button is selected, the relay system is included.

4. The image processing apparatus according to claim 1, wherein
the processor executes the program to perform:
receiving document image data by FAX communication and
the image data that is a target of the transferring is document image data received by FAX communication.

5. The image processing apparatus according to claim 1, wherein
the transfer destination other than the relay system is an external server capable of storing image data or an internal storage of the image processing apparatus.

6. An image processing apparatus comprising:
a memory that stores a program; and
a processor that executes the program to perform:
displaying a user interface screen for causing a user to set one or more transfer destinations of image data; and
transferring the image data to the set one or more transfer destinations,
wherein the user interface screen includes a button for storing the set one or more transfer destinations, and
wherein the button for storing the set one or more transfer destinations is validated after a transfer destination other than a relay system is set as one of the one or more transfer destinations on the user interface screen, and
wherein the relay system is a system that further transfers received image data.

7. The image processing apparatus according to claim 6, wherein
in a case where the relay system is designated as one of the one or more transfer destinations first on the user interface screen, a transfer destination other than the relay system is automatically added as the one or more transfer destinations.

8. A non-transitory computer readable storage medium storing a program for causing a computer to perform:
displaying a user interface screen for causing a user to set one or more transfer destinations of image data; and
transferring the image data to the set one or more transfer destinations,
wherein, when a first transfer destination is set on the displayed user interface screen, the user interface screen on which it is not possible to set a relay system as the first transfer destination is displayed so that another transfer destination other than the relay system is set as the first transfer destination,
wherein, if a second transfer destination is set on the displayed user interface screen after the first transfer destination other than the relay system is set, the user interface screen on which it is possible to set the relay system as the second transfer destination is displayed, and
wherein the relay system is a system that further transfers received image data.

9. An image processing method executed by an image processing apparatus, the method comprising:
displaying a user interface screen for causing a user to set one or more transfer destinations of image data; and
transferring the image data to the set one or more transfer destinations,
wherein, when a first transfer destination is set on the displayed user interface screen, the user interface screen on which it is not possible to set a relay system as the first transfer destination is displayed so that another transfer destination other than the relay system is set as the first transfer destination,
wherein, if a second transfer destination is set on the displayed user interface screen after the first transfer destination other than the relay system is set, the user interface on which it is possible to set the relay system as the second transfer destination is displayed, and
wherein the relay system is a system that further transfers received image data.

* * * * *